US00RE39482E

(19) United States
(12) Reissued Patent
Hayakawa et al.

(10) Patent Number: US RE39,482 E
(45) Date of Reissued Patent: *Feb. 6, 2007

(54) METHOD OF MAKING GRAIN-ORIENTED MAGNETIC STEEL SHEET HAVING LOW IRON LOSS

(75) Inventors: Yasuyuki Hayakawa, Okayama (JP); Mitsumasa Kurosawa, Tokyo (JP); Michiro Komatsubara, Okayama (JP)

(73) Assignee: JFE Steel Corporation (JP)

( * ) Notice: This patent is subject to a terminal disclaimer.

(21) Appl. No.: 10/263,573

(22) Filed: Oct. 3, 2002

Related U.S. Patent Documents

Reissue of:
(64) Patent No.: 6,309,473
Issued: Oct. 30, 2001
Appl. No.: 09/412,541
Filed: Oct. 5, 1999

(30) Foreign Application Priority Data

Oct. 9, 1998 (JP) ..... 10-287462
Oct. 9, 1998 (JP) ..... 10-287463
Oct. 28, 1998 (JP) ..... 10-307056

(51) Int. Cl.
*H01F 1/147* (2006.01)

(52) U.S. Cl. ..... 148/111; 148/112
(58) Field of Classification Search ..... 148/110–113
See application file for complete search history.

(56) References Cited

U.S. PATENT DOCUMENTS 4,179,315 A * 12/1979 Miller, Jr.
4,212,689 A * 7/1980 Shimizu et al.
4,416,707 A * 11/1983 Foster et al.
4,478,653 A * 10/1984 Littmann
4,952,789 A 8/1990 Suttie
5,509,976 A * 4/1996 Yamazaki et al.
6,423,157 B2 7/2002 Hayakawa et al.

FOREIGN PATENT DOCUMENTS

EP 1 521 731 * 7/1975
EP 0 869 190 A1 * 3/1998
FR 1.277.166 * 1/1961
FR 1.318.023 * 1/1963
FR 2 518 120 * 9/1982
JP 62-083421 4/1987

* cited by examiner

*Primary Examiner*—John P. Sheehan
(74) *Attorney, Agent, or Firm*—DLA Piper Rudnick Gray Cary US LLP

(57) ABSTRACT

Grain-oriented magnetic steel sheet made by the method-including hot rolling and final finish annealing, wherein (1) the O content in the steel slab is limited to up to about 30 ppm;

(2) for the entire steel sheet having final thickness including an oxide film before final finish annealing, from among impurities, the Al content is limited to up to about 100 wtppm, and the respective contents of B, V, Nb, Se, S, [P,] and N, to up to about 50 wtppm each; and (3) during final finish annealing, the N content in the steel is, at least in the temperature region of from about 850 to 950° C., limited within the range of from about 6 to 80 wtppm.

7 Claims, 10 Drawing Sheets

FIG. 3-a
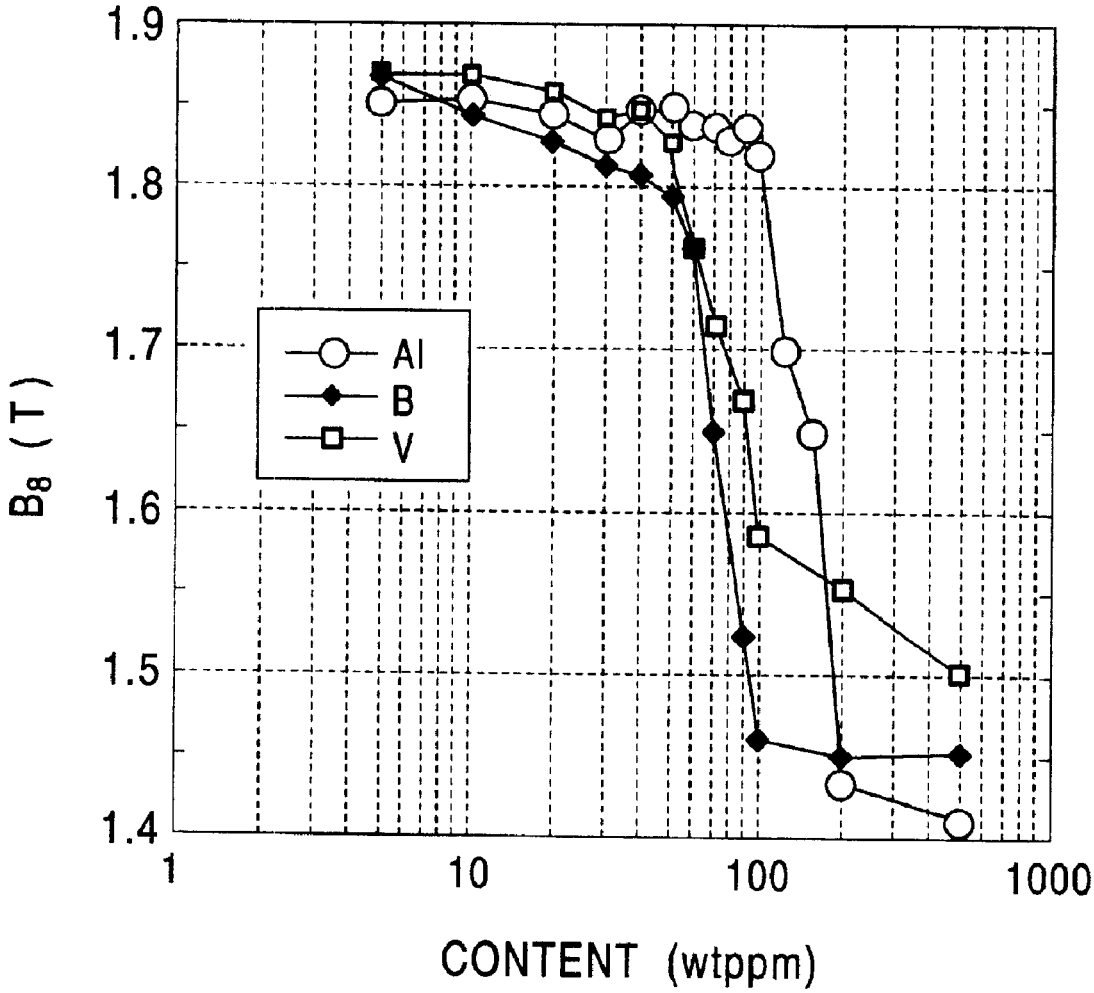

FIG. 3-b
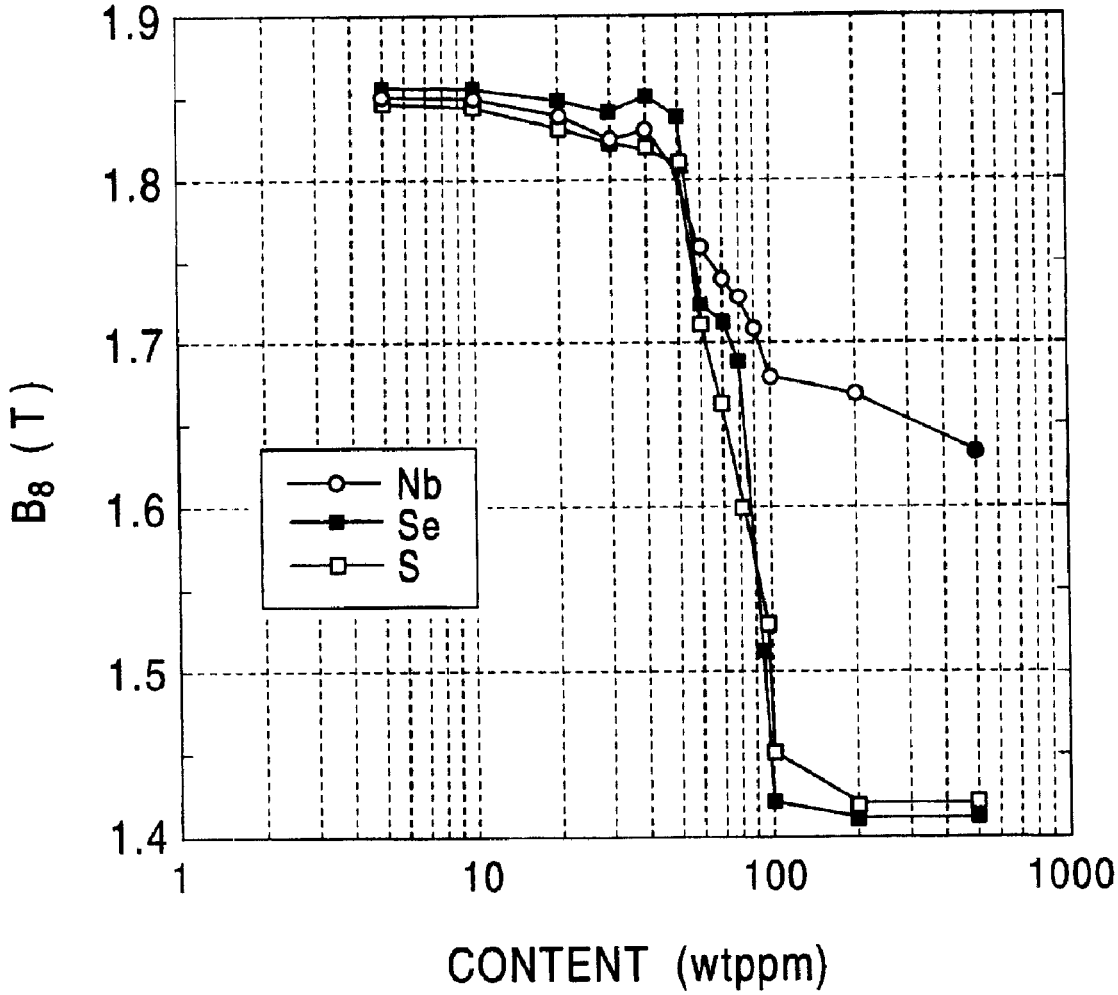

FIG. 3-c
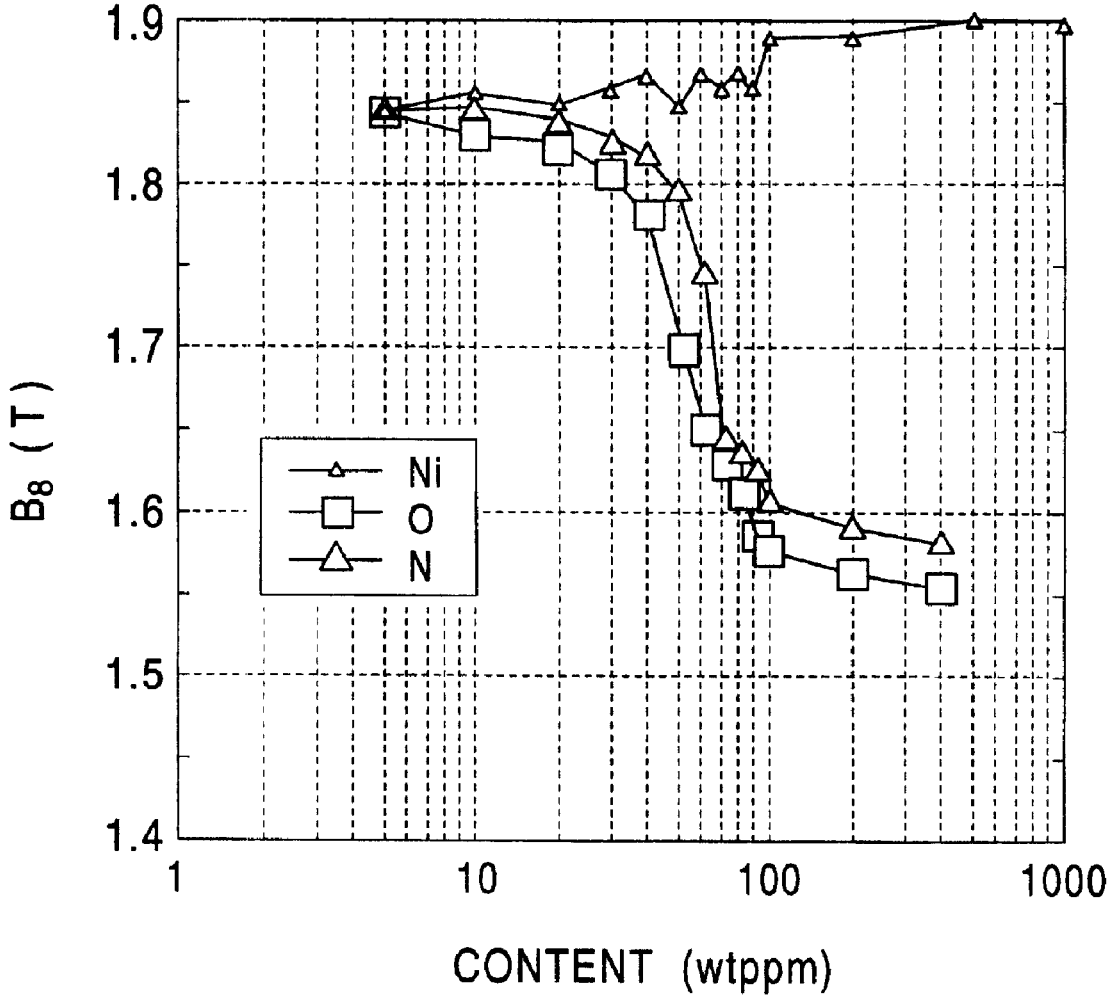

METHOD OF MAKING GRAIN-ORIENTED MAGNETIC STEEL SHEET HAVING LOW IRON LOSS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a grain-oriented magnetic steel sheet having a low iron loss, suitable for use as an iron core material mainly for electric power transformers and rotary machines.

2. Description of the Related Art

When manufacturing a grain-oriented magnetic steel sheet, it is a common practice to use a precipitate known as an inhibitor to produce secondary recrystallized grains of a Goss orientation ({110}<001>) during final finish annealing.

Representative methods so far disclosed include a method using AlN and MnS as disclosed in Japanese Patent publication No. 40-15644 and a method using MnS and MnSe as disclosed in Japanese Patent Publication No. 51-13469, both having already been industrialized.

Apart from the above, adding CuSe and Bn as disclosed in Japanese Patent Publication No. 58-42244, using nitrides such as those of Ti, Zr and V as disclosed in Japanese Patent Publication No. 46-40855 and many other methods are known.

These methods using inhibitors are useful for stably producing secondary recrystallized grains. However, because precipitates must be finely dispersed, it is necessary that the slab heating temperature before hot rolling is at least 1,300° C. Heating of the slab to a high temperature requires higher equipment cost, and in addition, results in an increase in the quantity of scale produced during hot rolling. This leads to many problems such as a lower product yield and a more complicated equipment maintenance.

Another problem involved in the methods using inhibitors is that these inhibitors constituents, if remaining after the final finish annealing, cause deterioration of the magnetic properties. For the purpose of eliminating these inhibitor constituents Al, N, Be, Se and S, therefore, purification annealing is carried out for several hours in a hydrogen atmosphere at a temperature of at least 1,100° C. after completion of secondary recrystallization. However, purification annealing carried out at such a high temperature leads to problems of a lower mechanical strength of the steel sheet, bucking of the lower part of the coil, and a considerably lower product yield.

It is true that, as a result of this high-temperature purification annealing, the contents of Al, N, B, Se and S in steel are reduced to up to 50 ppm, respectively. These constituents are however concentrated in the forsterite film; in the interface between the film and the iron substrate these constituents remain inevitably as single substances or as compounds. Presence of these substances prevents movement of a magnetic domain wall and causes an increase in iron loss. Further, these substances present in the film/iron interface inhibit grain boundary displacement of the crystal grains directly under the film. As a result, fine grains not completely encroached by secondary recrystallized grains are often present directly below the surface layer. Presence of such fine grains also causes deterioration of the magnetic properties. Moreover, it is still difficult to eliminate Nb, Ti and V even by high-temperature purification annealing, and this is also a cause of deterioration of iron loss.

The manufacturing methods of a grain-oriented magnetic steel sheet using inhibitors faces the problem of a high cost as described above; achievement of a lower iron loss is also limited. In order to avoid these problems, we have considered use of a method not using an inhibitor.

There are known manufacturing methods of a grain-oriented magnetic steel sheet without using an inhibitor such as those disclosed in Japanese Unexamined Patent Publication No. 64-55339, No. 2-57635, No. 7-76732 and No. 7-197126. One of the features common to these techniques is that it is intended to preferentially cause growth of grains having the {110} orientation, using the surface energy as a driving force.

In order to effectively utilize the difference in surface energy, it is necessarily required to use a thin sheet for increasing the contribution of the surface. For example, the technique disclosed in Japanese Unexamined Patent Publication No. 64-55339 limits the thickness to up to 0.2 mm, and the technique disclosed in Japanese ah Unexamined Patent Publication No. 2-57635, to up to 0.15 mm. The technique disclosed in Japanese Unexamined Patent Publication No. 7-76732, not particularly limiting the thickness, reveals a very poor orientational integration as typically represented by a magnetic flux density of up to 1.700 T for $B_8$, for a thickness of 0.30 mm according to Example 1 presented in the specification thereof. In the examples shown therein, the thickness giving a satisfactory magnetic flux density is limited to 0.10 mm. In a technique disclosed in Japanese Unexamined Patent Publication No. 7-197126 also, the thickness is not limited, but the technique is for applying a tertiary cold rolling of from 50 to 75%. The thickness necessarily becomes smaller: a thickness of 0.10 mm is proposed in an example shown in the Publication.

Most of the thicknesses of grain-oriented magnetic steel sheet now commonly use at least 0.20 mm. That is, it is difficult to obtain a product generally in use by a method using the surface energy as described above.

Further, in order to utilize surface energy, it is necessary to carry out the final finish annealing at a high temperature in a state in which the growth of surface oxides is inhibited. For example, Japanese Unexamined Patent Publication No. 64-55339 discloses a technique of using a vacuum, an inert gas, or a mixed gas of hydrogen and nitrogen as an annealing atmosphere at a temperature of at least 1,180° C. Japanese Unexamined Patent Publication No. 2-57635 recommends using an inert gas, hydrogen or a mixed gas of hydrogen and an inert gas as an annealing atmosphere at a temperature of from 950 to 1,100° C., and further, reducing the pressure of the atmospheric gases. Japanese Unexamined Patent Publication No. 7-197126 discloses a technique of carrying out final finish annealing at a temperature within a range of from 1,000 to 1,300° C. in a non-oxidizing atmosphere having an oxygen partial pressure of up to 0.5 Pa or in vacuum.

When desiring to obtain satisfactory magnetic properties by the use of surface energy, as described above, the atmosphere for the final finish annealing must be an inert gas or hydrogen, and a vacuum is suggested as a recommended condition. However, it is very difficult to use a high temperature and a vacuum simultaneously in equipment, further leading to high cost.

When utilizing surface energy, only the grains having the {110} plane are selected to grow. In other words, unlike secondary recrystallization using an inhibitor, it is not always possible that a Goss grain growth with the <001> orientation aligned with the rolling direction is selected. Magnetic properties of a grain-oriented electromagnetic steel sheet are improved only when the easy axis of magnetization <001> is aligned to the rolling direction. Satisfactory magnetic properties are unavailable in principle with the selection of grains having the {110} plane alone. That is, satisfactory magnetic properties are available only under very limited rolling conditions or annealing conditions in a method using surface energy. As a result, magnetic properties of a steel sheet available by use of surface energy are inevitably very unstable.

In a method using surface energy, furthermore, formation of a surface oxide layer must be inhibited during final finish annealing. In other words, an annealing separator such as MgO cannot be coated for annealing. It is therefore impossible to form an oxide film similar to that of an ordinary grain-oriented magnetic steel sheet manufactured using an inhibitor after final finish annealing. For example, a forsterite film is an oxide film formed on an ordinary grain-oriented magnetic steel sheet surface made by using an inhibitor upon coating an annealing separator mainly comprising MgO. The forsterite film not only imparts a tension to the steel sheet surface, but also exerts a function of ensuring adhesion of an insulating tensile coating mainly comprising a phosphate to be coated and baked. In the absence of a forsterite film, therefore, there is a large iron loss.

More specifically, the use of surface energy, known as a manufacturing technique of a grain-oriented magnetic steel sheet not using an inhibitor, encounters problems of a limited thickness of steel sheet, a poor accumulation of secondary recrystallized grain orientations, and iron loss caused by the absence of a surface oxide film.

SUMMARY OF THE INVENTION

The present invention provides a manufacturing method not using an inhibitor, which permits avoidance of the problems encountered when using an inhibitor, resulting from the high-temperature slab heating before hot rolling and the high-temperature purification annealing after secondary recrystallization. The invention has an object to provide a favorable solution of the problems necessarily resulting from non-use of an inhibitor but using surface energy, including limited range of steel sheet thickness, poor accumulation of the secondary recrystallized grain orientation, and iron loss caused by the absence of a surface oxide film.

More particularly, an object of the invention is to create a grain-oriented magnetic steel sheet which, even when an inhibitor is not used, does not limit the steel sheet thickness, is free from deterioration of the accumulation of secondary recrystallized grain orientation, and permits reduction of iron loss through positive formation of a surface oxide film.

This invention also proposes the creation of a secondary recrystallized grain texture and secondary recrystallization annealing conditions which permit achievement of the aforementioned object.

The proposed secondary recrystallized grain texture comprises extra-fine crystal grains produced in coarse secondary recrystallized grains, and the proposed secondary recrystallization annealing conditions are materialized by the use of a temperature gradient.

More specifically, the invention provides a manufacturing method of a grain-oriented magnetic steel sheet, comprising the steps of hot-rolling a steel slab containing up to about 0.12 wt % C, from about 1.0 to 8.0 wt % Si, and from 0.005 to 3.0 wt % Mn, applying annealing to the resultant hot-rolled steel sheet as required, subjecting the resultant annealed sheet to one or more runs of cold rolling including intermediate annealing into a final thickness, then applying decarburization annealing as required, coating an annealing separator as required, and then applying final finish annealing; wherein:

(1) the O content of the steel slab is limited to up to about 30 ppm;

(2) for the entire steel sheet including an oxide film present before final finish annealing, from among impurities, the Al content is limited to up to about 100 ppm, and the contents of B, V, Nb, Se, S, and N are limited to up to about 50 ppm, and (3) during final finish annealing, the N content in the steel at least in a temperature region of from about 850 to 950° C. is limited within a range of from about 6 to 80 ppm.

Further, the invention provides a method of manufacturing a grain-oriented magnetic steel sheet, wherein:

the N content in the steel is controlled during final finish annealing by one or more of:

(a) increasing the nitrogen partial pressure in the atmosphere at least in the temperature region of from 850 to 950° C. during final finish annealing; or (b) adding a nitrification accelerating agent to the annealing separator.

The invention provides also a grain-oriented magnetic steel sheet having a low iron loss having a composition containing from about 1.0 to 8.0 wt % Si, and an oxide film mainly comprising forsterite ($Mg_2SiO_4$), wherein the contents of Al, B, Se and S in the entire steel sheet including the oxide film are up to about 50 ppm, respectively.

BRIEF DESCRIPTION OF THE DRAWINGS

FIG. 3-a, FIG. 3-b, and FIG. 3-c are graphs illustrating the relationship between the contents of individual impurities and the magnetic flux density;

DESCRIPTION OF THE PREFERRED EMBODIMENTS

We have carried out extensive studies on the mechanism of secondary recrystallization of Goss orientation grains. As a result, we have discovered that grain boundaries having an orientational differential angle within a range of from about 20 to 45° in the primary recrystallization texture played an important role, and reported our findings in a paper (Acta Material, vol. 45 (1997), p. 85).

Figure 1:
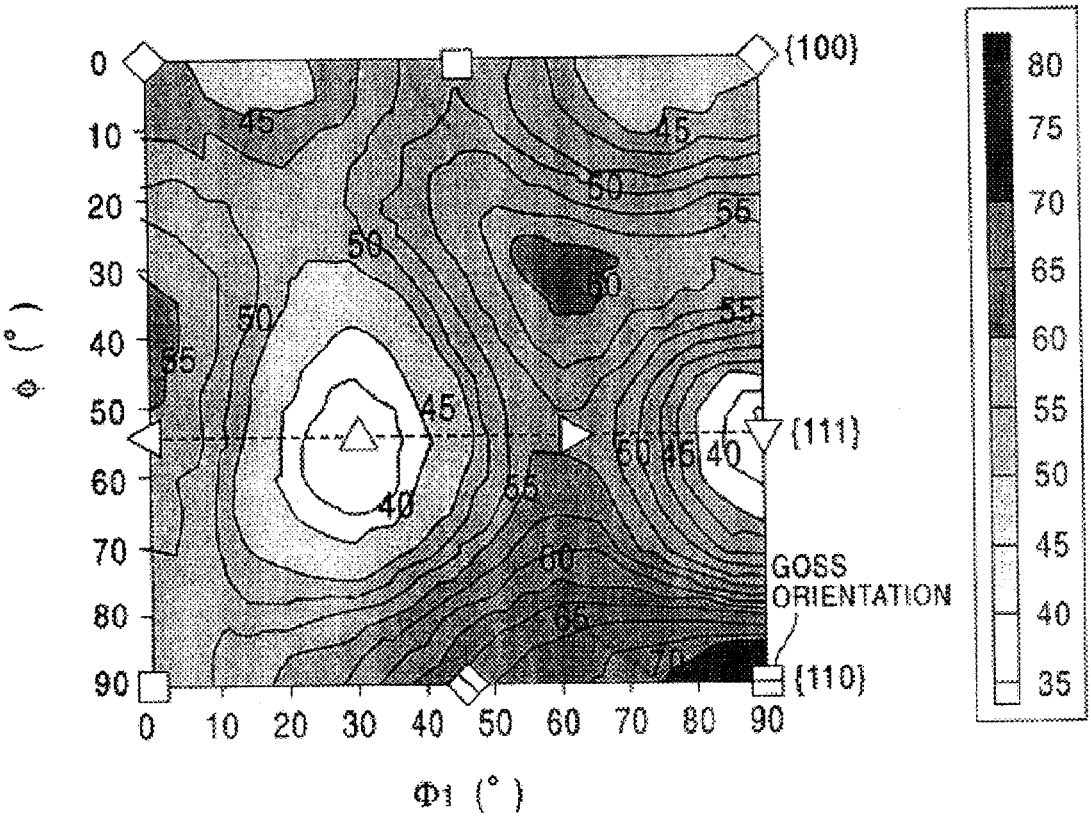
FIG. 1 illustrates the frequency of occurrence of individual orientation grains in the grain boundary at an orientational differential angle within a range of from 20 to 45° before finish annealing.

FIG. 1 illustrates the result of an investigation of the frequency of presence of grain boundaries having an orientational differential angle of from 20 to 45° relative to the grain boundaries as a whole surrounding individual crystal grains having various crystal orientations, through analysis of the primary recrystallized grain texture immediately before secondary recrystallization of a grain-oriented magnetic steel sheet. In FIG. 1, the crystal orientational space is indicated by the use of a $\Phi_2$=45° cross-section of the Euler angles ($\Phi_1$, $\Phi$, $\Phi_2$), and the Goss orientation and other main orientations are schematically represented. FIG. 1 suggests that, around Goss orientation grains, grain boundaries having an orientational differential angle within a range of from 20 to 45° show the highest frequency (about 80%) of occurrence.

According to the experimental data reported by C. G. Dunn et al. (AIME Transactions, vol. 188 (1949), p. 368), a grain boundary having an orientational differential angle of from 20 to 45° is a high-energy grain boundary. This high-energy grain boundary, having a large free space within the boundary and a complicated structure, permits easy displacement of atoms. That is, the grain boundary diffusion, which is a process of displacement of atoms through a grain boundary, is more rapid in a higher-energy grain boundary.

Secondary recrystallization is known to take place along with the growth of precipitates called inhibitors. Growth of precipitates proceeds under the control of diffusion. Because precipitates on the high-energy grain boundaries preferentially grain boundaries is preferentially released, and the high-energy grain boundaries begin moving.

From the aforementioned findings, we have determined that, in a grain-oriented magnetic steel sheet, Goss grains exhibiting a high frequency of occurrence relative to easily moving high-energy grain boundaries were subjected to secondary recrystallization.

As a result of further studies, we found that an essential factor of secondary recrystallization of Goss orientation grains lies in the state of distribution of high-energy grain boundaries in the primary recrystallized grain texture; and the role of the inhibitor is only to produce a difference in the speed of displacement between the high-energy grain boundaries and the other grain boundaries. We have found therefore that even without the use of an inhibitor, generation of a difference in speed of displacement of grain boundaries, if possible, would cause occurrence of secondary recrystallization.

Impurity elements present in steel tend to easily segregate in grain boundaries, particularly in high-energy grain boundaries. When many impurity elements are present, therefore, a difference is considered to have been eliminated in the displacement speed between the high-energy grain boundaries and the other grain boundaries. If the effect of such impurity elements can be excluded by purifying the material, therefore, it is considered possible to cause secondary recrystallization of Goss orientation grains through actualization of difference in displacement speed between high-energy grain boundaries primarily dependent upon the texture of the high-energy grain boundaries and the other grain boundaries.

We have further studied and have discovered that, in a composition not containing an inhibitor constituent, secondary recrystallization proceeds under the effect of purification of the material and action of trace nitrogen, and have thus completed the present invention. The technique disclosed in the present invention is based on a concept that is the reverse of that of the conventional secondary recrystallization technique, in that precipitates or impurities in grain boundaries are excluded. Unlike the technique using surface energy, secondary recrystallization can be effectively realized even in the presence of oxides on the steel sheet surface, if any.

The results of experiments, which led to successful development of the present invention, will now be described.

Experiment 1

The following steel slabs were manufactured by continuous casting: a steel slab A containing 0.070 wt. % C, 3.22 wt. % Si, and 0.070 wt. % Mn, and having an Al content reduced to 10 ppm, an N content reduced to 30 ppm, an O content reduced to 15 ppm and contents of the other impurities limited to up to 50 ppm, respectively; a steel slab B containing 0.065 wt. % C, 3.32 wt. % Si, 0.070 wt. % Mn, 0.025 wt. % Al, and 30 ppm N, and having contents of the other impurities limited to up to 50 ppm, respectively; and a steel slab C containing 0.055 wt. %, 3.25 wt. % Si, and 0.070 wt. % Mn, and having an Al content reduced to 10 ppm, an N content reduced to 30 ppm, an O content reduced to 60 ppm and contents of the other impurities limited to up to 50 ppm, respectively. These slabs were heated to 1,100° C. and hot-rolled and finished into hot-rolled sheets having a thickness of 2.6 mm. Each hot-rolled sheet was soaked in a nitrogen atmosphere at 1,000° C. for a minute and rapidly cooled. Thereafter, the soaked sheet was cold-rolled into a final thickness of 0.34 mm. Then, the cold-rolled sheet was subjected to decarburization annealing in an atmosphere comprising 75% hydrogen and 25% nitrogen with a dew point of 65° C. at a temperature of 840° C. for 120 seconds to reduce the C content to 0.0020 wt. %. A chemical analysis carried out for the other constituents before finish annealing showed almost no change in the contents other than that of carbon in any of steels A, B and C. None of the impurity elements exceeded 50 ppm in content.

Thereafter, an annealing separator mainly comprising MgO was coated, and then, final finish annealing was applied. The final finish annealing was accomplished in a nitrogen atmosphere to 1,050° C. at a heating rate of 20° C/h. For comparison purposes, the similar final finish annealing was carried out in an Ar atmosphere.

As a result, while steel A was secondary-recrystallized when subjected to the final finish annealing in the nitrogen atmosphere, not in the Ar atmosphere. In contrast both steel B and steel C were not secondary-recrystallized in any of these atmospheres. The product of secondary-recrystallized steel A showed a magnetic flux density of 1.87 T, which was a sufficiently satisfactory level for magnetic properties of a grain-oriented magnetic steel sheet.

In this experiment, occurrence of secondary recrystallization of a high-purity steel not containing an inhibitor at all and having reduced Al and O contents was clearly demonstrated by carrying out a final finish annealing in a specific annealing atmosphere.

Steel A after finish annealing at 1,050° C. had a nitrogen content of 35 wtppm when the finish annealing was applied in the nitrogen atmosphere, and 3 wtppm when it was applied in the Ar atmosphere. That is, a correlation was observed between the annealing atmosphere and the nitrogen content.

As a result of further experimental efforts based on the aforementioned findings, it was revealed that the nitrogen content in steel during annealing at a temperature of at least 850° C. up to the end of secondary recrystallization in the finish annealing exerts an effect on the occurrence of secondary recrystallization. In an additional experiment, the nitrogen content was adjusted by acting on the nitrogen content in the slab material and on the nitrogen partial pressure in the finish annealing atmosphere. The nitrogen content in the steel was measured by taking out a sample in the middle of the final finish annealing conducted at a heating rate of 20° C./h and analyzing the same. The magnetic flux density was measured by discontinuing the final finish annealing at 1,050° C. The results obtained are shown in FIG. 2.

Figure 2:
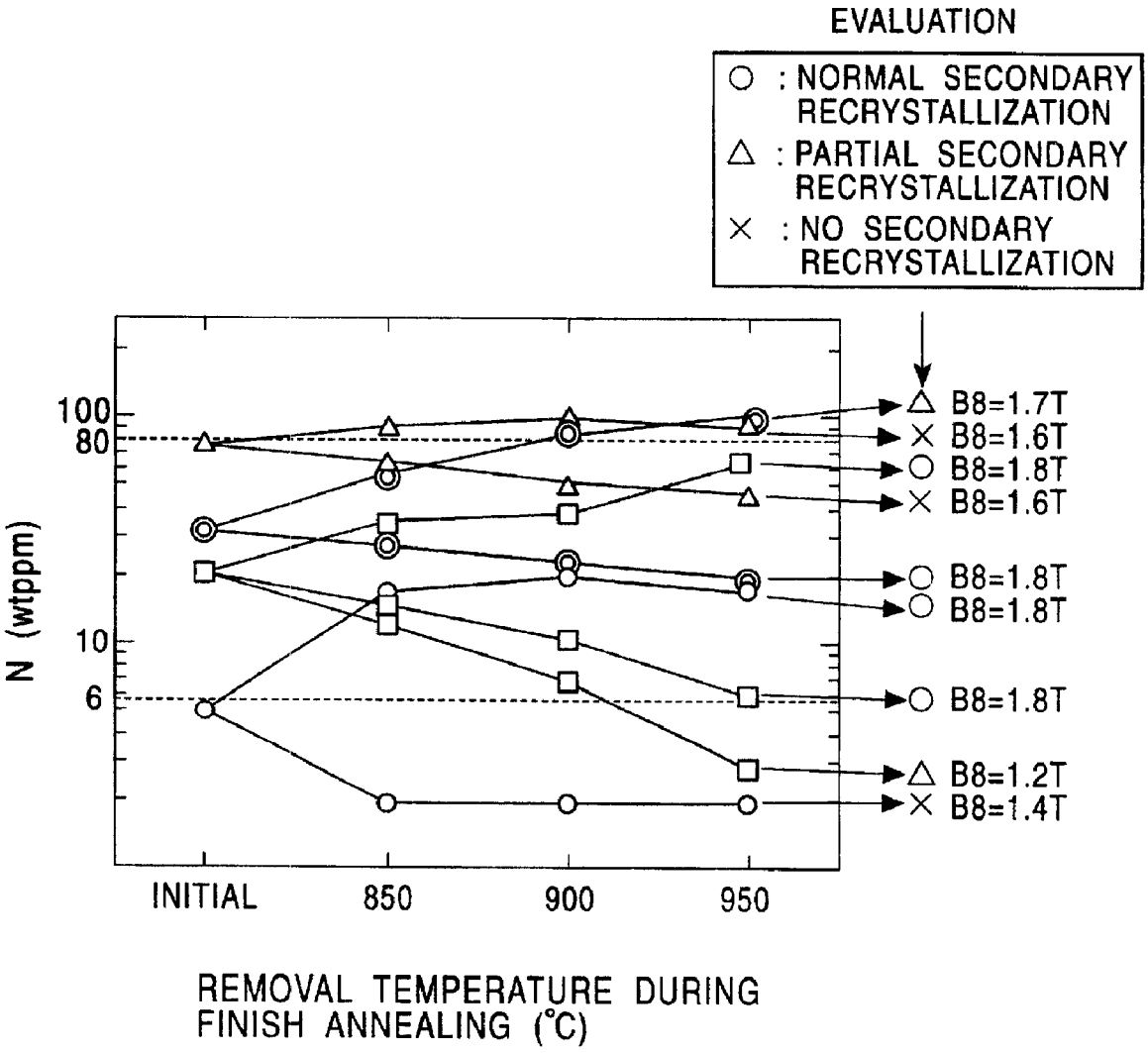
FIG. 2 is a graph illustrating the relationship between the nitrogen content in steel during finish annealing and the magnetic flux density after finish annealing.

As shown in FIG. 2, secondary recrystallization was found to take place satisfactorily when the nitrogen content in the steel before finish annealing was small, and the nitrogen content in the steel in a temperature range of from 850° C. at which secondary recrystallization starts to 950° C. was within a range of from 6 to 80 ppm. When the N content was high before the finish annealing and when the nitrogen content during the finish annealing was low in contrast, secondary recrystallization did not occur, resulting in a decreased magnetic flux density.

A further additional experiment was carried out with a view to obtaining further findings about the effect of trace constituents (Al, B, V, Nb, Se, S, Ni, O, N, Sn, Sb, Cu, Mo and Cr) contained in the material before the final finish annealing. The basic composition of molten steel was fixed to 0.06 wt % C, 0.06 wt % Mn and 3.3 wt % Si, and similar steps as in the aforementioned experiment were followed to investigate magnetic properties. The final finish annealing was carried out in a nitrogen atmosphere.

FIG. 3-a, FIG. 3-b and FIG. 3-c comprehensively illustrate the effects of the amounts of added Al, B, V, Nb, Se, S, [P,] Ni, O and N on the magnetic flux density. As shown in the graphs, secondary recrystallization became harder to achieve for all the elements by increasing the contents thereof, which led to a lower magnetic flux density. Particularly for Al, a nitride former, a content of over about 100 ppm resulted in an extreme decrease in magnetic flux density, thus seriously preventing occurrence of secondary recrystallization. For B, V, Nb and N, a content of over about 30 ppm caused deterioration of magnetic properties, and a content of over about 50 ppm seriously prevented occurrence of secondary recrystallization. Also for Se[.] *and* S[and P], the tendency was similar to that of B and the like. Particularly an O content of over about 30 ppm caused a sudden deterioration of magnetic properties. As an exception, addition of Ni was observed to improve magnetic flux density. A conceivable reason is that addition of Ni accelerates the transformation $\alpha \rightarrow \gamma$, thus improving the crystal structure of the steel. Ni, which does not form precipitates such as nitrides and is not an element segregating at grain boundaries, is considered less detrimental to manifestation of secondary recrystallization. Further, Ni, being a ferro-magnetic element, is thought to contribute to the improvement of magnetic flux density.

Figure 4:
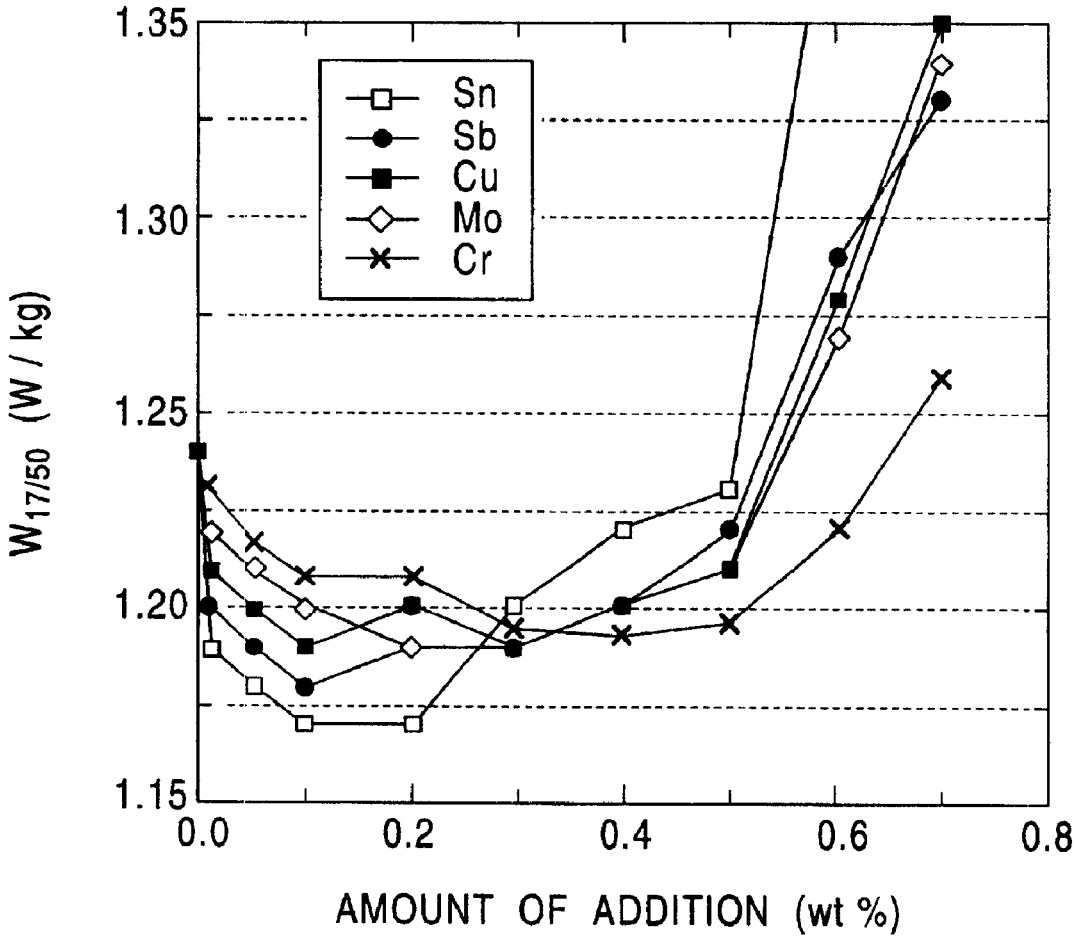
FIG. 4 is a graph illustrating the relationship between the amounts of individual added elements and iron loss.

FIG. 4 illustrates the result of investigation of the effects of the addition of Sn, Sb, Cu, Mo and Cr on iron loss of the product sheet. FIG. 4 suggests that iron loss is reduced by adding these elements in appropriate amounts. The reason is considered to be that addition of these elements causes refinement of secondary recrystallized grains. It is thus revealed that, in order to improve iron loss, it is necessary to add from about 0.02 to 0.50 wt % Sn, from about 0.01 to 0.50 wt % Sb, from about 0.01 to 0.50 wt % Cu, from about 0.01 to 0.50 wt % Mo and from about 0.01 to 0.50 wt % Cr. Addition above these levels prevents secondary recrystallization leading to deterioration of iron loss.

Experiment 2

We further carried out studies on the effect of trace constituents remaining in the steel sheet after final finish annealing.

In slabs used in the experiment, the composition was fixed to 0.07 wt % C, 3.3 wt % Si and 0.06 wt % Mn, with various contents of Al, B, Se and S. Each slab was heated to 1,400° C. for 30 minutes, and then hot-rolled to a hot-rolled sheet having a thickness of 2.3 mm. Then, after hot-rolled sheet annealing at 1,100° C. for 60 seconds, the annealed sheet was cold-rolled into a final thickness of 0.35 mm. The resultant cold-rolled sheet was decarburization annealed at 850° C. for three minutes in an atmosphere comprising 50% hydrogen and 50% nitrogen with a dew point of 60° C. After coating MgO serving as an annealing separator at an amount of 10 g/m$^2$, final finish annealing of heating the sheet to 1,200° C. at a rate of 15° C./h was applied in a hydrogen atmosphere to manufacture a grain-oriented magnetic steel sheet.

The relationship between the contents of Al, B, Se and S and magnetic properties was investigated for the entire magnetic steel sheet with a forsterite film thus obtained.

Figure 5:
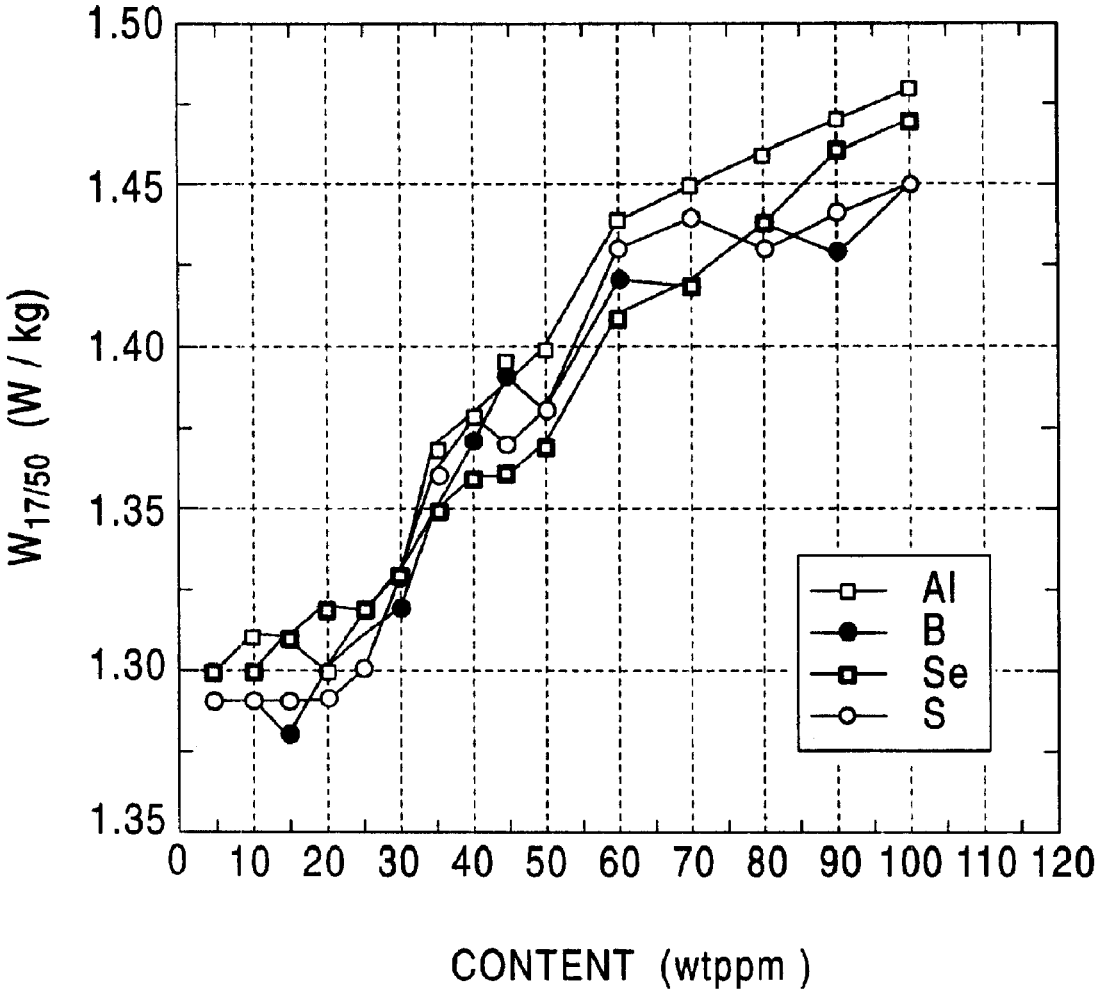
FIG. 5 is a graph illustrating the effect of trace constituents in an electromagnetic steel sheet coated with a film on iron loss.

In the steel substrate after removal of the forsterite film, the contents of Al, B, Se and S were reduced to up to about 5 wtppm. For the entire steel sheet with the forsterite film, however, the analytical value varies with the kinds and amounts of Al, B, Se and S contained in the material. For products having the same magnetic flux density, the relationship between the analytical values of the individual constituents and the iron loss value is comprehensively illustrated in FIG. 5. In FIG. 5, the effects of the individual constituents are independently shown since the contents are reduced to up to about 5 wtppm except for constituents of which the amounts of addition are changed.

As is clear from FIG. 5, for any of Al, B, Se and S, the iron loss became deteriorated when the content exceeds 20 ppm, and deterioration of iron loss is particularly serious when the content became over 50 ppm. This clearly suggests that, even when impurities are removed from steel, Al, B, Se or S, if remaining in the oxide film, causes a serious deterioration of iron loss. When using a manufacturing method not using an inhibitor constituent as a material, in contrast, it is possible to effectively reduce the contents of Al, B, Se and S in the oxide film. Particularly, it was found anew that reduction of the contents of these elements to up to about 20 ppm, respectively, led to a satisfactory iron loss.

In the above-mentioned experiments, a high magnetic flux density in a composition not containing an inhibitor constituent is possible because of the occurrence of secondary recrystallization under the effect of purification of the material and trace nitrogen.

The reason thereof has not as yet been fully clarified, but we consider as follows:

In the high-purity material not containing an inhibitor in the present invention, ease of grain boundaries movement may reflect the grain boundary structure. Since impurity elements tend to preferentially segregate in grain boundaries, particularly in high-energy grain boundaries, a difference in migration speed between high-energy grain boundaries and the other grain boundaries is considered to be eliminated when large amounts of impurities are present.

From such a point of view, secondary recrystallization of Goss orientation grains is believed to be possible by eliminating the effect of such impurities through purification of the material, which achieves superiority of the migration speed of the high-energy grain boundaries.

As to the effect of nitrogen, we consider as follows: the form of nitrogen acting in the invention is solid-solution nitrogen. A possible reason is that containing a nitride former such as Al, B and Nb makes it impossible for secondary recrystallization to occur, and the nitrogen content effective for manifestation of secondary recrystallization is smaller than the amount capable of being dissolved into a solid-solution form.

First, because grain boundary migration is accelerated by the purification of the material, the grains after primary recrystallization have a grain size of about 100 μm, ten times as large as that in the presence of an inhibitor. When solid-solution nitrogen is not present, however, further grain growth is caused during finish annealing. The grain boundary energy serving as a driving force for secondary recrystallization therefore tends to be insufficient, whereby secondary recrystallization does not occur. When solid-solution nitrogen is present, in contrast, solid-solution nitrogen inhibits grain growth during finish annealing, and this is estimated to be effective for ensuring a driving force for secondary recrystallization.

Further, the grain growth inhibiting effect of solid-solution nitrogen is different from the effect of nitrides in the following respects:

More specifically, the grain boundary migration inhibiting effect of solid-solution nitrogen is, unlike the pinning effect provided by an inhibitor, an effect of resisting grain boundary migration through segregation at grain boundaries, known as a "dragging" effect. In the presence of a nitride former, mixing of nitrogen during final finish annealing leads to ingression thereof onto grain boundaries where diffusion is rapid from the atmosphere and causes preferential precipitation of nitrides on the grain boundaries. Further, because the speed of diffusion is higher on the high-energy grain boundaries having more free spaces within the grain boundaries and preferential precipitation is accelerated more, migration of the high-energy grain boundaries is preferentially inhibited, and this is considered to prevent secondary recrystallization of Goss orientation grains from occurring.

Also when nitrogen is present in an amount larger than about 50 ppm before the finish annealing, secondary recrystallization is inhibited. Although the reason is not clearly known, formation of coarse silicon nitride grains is considered to cause a decrease in the amount of solid-solution nitrogen.

In the presence of solid-solution impurity elements such as S and Se, these elements preferentially segregate on the high-energy grain boundaries having many free spaces within the grain boundaries, and cause considerable stagnation of the migration speed of the high-energy grain boundaries, resulting in non-occurrence of secondary recrystallization. For this reason, solid-solution elements are not used singly in general, but are used in a composite form to serve as an inhibitor.

In contrast, nitrogen has a sufficiently high diffusion speed within the secondary recrystallization temperature region, and solid-solution nitrogen can follow grain boundary migration. The dragging effect thereof is therefore poorer than that of the other impurity elements. It is however considered to have a function of reducing the grain boundary migration speed almost constantly irrespective of the grain boundary structure. It is therefore possible, as a result of such a function of solid-solution nitrogen, to inhibit grain growth while keeping the superiority of grain boundary migration of high-energy grain boundaries relative to the other grain boundaries. A driving force necessary for secondary recrystallization is considered to be ensured as described above.

In addition, unlike nitride precipitates, solid-solution nitrogen residue on the product sheet does not prevent movement of a magnetic domain wall. It is not therefore necessary to remove it by applying a high-temperature purification annealing during finish annealing. In the invention, therefore, it is possible to discontinue the final finish annealing upon completion of secondary recrystallization or upon formation of the forsterite film. As a result, it is possible to achieve productivity improvement and-equipment simplification, and further, prevention of buckling of the coil lower part during high-temperature annealing.

The technique of the invention has superiority over the technique using surface energy in the following respects:

First because secondary recrystallization takes place with the grain boundary energy as a driving force, there is not significant limitation on the thickness. For example, even for a thickness of at least about 1 mm, secondary recrystallization is possible. A product having such a large thickness, having a poor iron loss value, but a high magnetic permeability, is applicable as a magnetic shielding material.

In a condition in which a surface oxide film is produced, secondary recrystallization is possible at a generally used heat treatment temperature within a range of from about 850 to 950° C. For the annealing atmosphere, it is not necessary to use a vacuum or an expensive inert gas for annealing atmosphere, but an atmosphere mainly comprising inexpensive nitrogen most commonly used is applicable. When the material composition contains much nitrogen, hydrogen or Ar may be mixed to keep an appropriate amount of nitrogen or any of these atmospheres may be singly employed.

The reasons for limitations on the chemical composition of the steel, in the practice of this invention, will now be described.

C: Down to About 0.12 wt %

C is effective for improving magnetic properties through improvement of structure, but it must be removed in decarburization annealing. As a C content of over about 0.12 wt % makes it difficult to remove in decarburization annealing, the C content should be down to about 0.12 wt %. No limitation is provided on the lower limit because secondary recrystallization is possible even in a material not containing C. Particularly, when the C content is reduced to down to about 30 ppm in the material stage, it is possible to omit the decarburization annealing, and this favorably reduces production cost. For the manufacture of a low-quality product, therefore, a material having a reduced C content may be used. When the grain-oriented magnetic steel sheet of the invention is applied as a magnetic shielding material required to have a prescribed magnetic permeability, not particularly requiring a forsterite film, a material having reduced C content may be used, and finish annealing may be applied immediately after cold rolling without decarburization annealing.

Si: From About 1.0 to 8.0 wt %

Si improves electric resistance and effectively contributes to the reduction of iron loss. For this purpose, however, the Si content should be at least about 1.0 wt %. A Si content of over about 8.0 wt % leads, on the other hand, not only to a lower magnetic flux density, but also to serious deterioration of secondary workability of the product. The Si content should therefore be within a range of from about 1.0 to 8.0 wt %, or more preferably, within a range of from about 2.0 to 4.5 wt %.

Mn: From About 0.005 to 3.0 wt %

Mn is an element necessary for obtaining a better hot workability. This effect is however poor with an Mn content of under about 0.005 wt %. An Mn content of over about 3.0 wt %, on the other hand, makes it difficult for secondary recrystallization to occur. The Mn content should therefore be within a range of from about 0.005 to 3.0 wt %.

O: Down to About 30 wtppm

In the present invention, it is important to reduce the O content to about 30 wtppm or less in the slab stage. In the invention, O seriously hinders manifestation of secondary recrystallization, and it is difficult to remove O in a high-temperature purification annealing.

In the present invention, the following elements may appropriately be contained for improving magnetic properties.

Ni: From About 0.005 to 1.50 wt %

Ni is an element useful for improving magnetic properties through improvement of the structure, and may be added as required. A Ni content of under about 0.005 wt % leads to only a slight improvement of magnetic properties. A Ni content of over about 1.50 wt % results, on the other hand, in an instable secondary recrystallization and deterioration of magnetic properties. The Ni content should therefore be within a range of from about 0.005 to 1.50 wt %.

Sn: From About 0.05 to 0.50 wt %: Sb: From About 0.01 to 0.50 wt %: Cu: From About 0.01 to 0.50 wt %: Mo: From About 0.01 to 0.50 wt %: Cr: From About 0.01 to 0.50 wt %.

All these elements have a function of improving iron loss, and may be added singly or in combination as required. A content of under the lower limit provides only a poor effect of improving iron loss. With a content of over the upper limit, secondary recrystallization does not occur. The contents of these elements should therefore be within the aforementioned ranges.

In the invention, impurity elements should be eliminated as far as possible. Particularly, Al, which is a nitride former, is not only detrimental to the occurrence of secondary recrystallization grains but also by remaining in the steel substrate and causing deterioration of iron loss, should preferably be reduced to about 100 ppm or less. The B, V, Nb, S, Se[, P,] and N contents should preferably be reduced to about 50 ppm or less, or more preferably to about 30 ppm or less. It is not always necessary to reduce the contents of these elements within the above-mentioned ranges in the material stage. It suffices that the content has been reduced to about 50 ppm or less before final finish annealing. However, because it is difficult to remove in a step such as purification annealing, it is desirable to reduce the content in the material stage as far as possible. The values of limitations on the contents of these impurity elements cover not only the steel substrate but also the entire steel sheet including the surface oxide film. The surface oxide film means subscale or an oxide film.

The appropriate manufacturing method of the invention will now be described.

First, a slab is manufactured from a molten steel prepared with the aforementioned optimum chemical composition. This slab is manufactured by the ordinary casting-slabbing process or the continuous casting process. A thin slab having a thickness of up to about 100 mm may be manufactured by the direct casting process.

While the slab may be hot-rolled after heating, it also may be hot-rolled immediately after casting without heating. For the thin slab, hot rolling may be omitted.

Since an inhibitor constituent is not present in the material, the slab heating temperature suffices to be about 1,100° C. which is the lowest temperature permitting hot rolling.

Then, after applying hot-rolled sheet annealing as required, the resultant sheet is subjected to one or more runs of cold rolling with an intermediate annealing in between. The cold-rolled sheet is then decarburization annealed as required, then, after coating with an annealing separator mainly comprising MgO, the sheet is subjected to final finish annealing.

Application of the hot-rolled sheet annealing is useful for improving magnetic properties. Conducting the intermediate annealing between two runs of cold rolling is also useful for stabilizing magnetic properties. However, because these steps lead to higher production cost, selection or omission of the hot-rolled sheet annealing or the intermediate annealing is determined from the economic point of view.

The appropriate temperature for the hot-rolled sheet annealing and the intermediate annealing is within a range of at least about 700° C. and up to about 1,200° C. With an annealing temperature of under about 7000° C., recrystallization does not show a satisfactory progress during annealing, thus limiting the above-mentioned effect. A temperature of over about 1,200° C., on the other hand, leads to a lower strength of the steel sheet and makes it difficult to pass the sheet on the producing line.

It is not necessary to apply the decarburization annealing when using a material not containing C. Because the sheet surface is oxidized by oxides and hydroxides in the annealing separator during the final finish annealing, it is not always necessary to conduct oxidation prior to the final finish annealing.

Prior to the final finish annealing, the technique of increasing the Si content after completion of cold rolling may simultaneously be applied by the silicon dipping process.

In the invention, limiting the Al content to about 100 ppm or less and the contents of B, V, Nb, Se, S, [P,] and N to about 50 ppm or less, or more preferably, to about 30 ppm or less for the entire steel sheet including the oxide film before the final finish annealing is an essential condition for achieving manifestation of secondary recrystallization.

In the invention, it is important to control the N content within a range of from about 6 to 80 ppm at least in a temperature region of from about 850 to 950° C. during the final finish annealing. A nitrogen content of under about 6 ppm leads to non-occurrence of secondary recrystallization, thus failing to improve magnetic properties. With an N content of over about 80 ppm, on the other hand, grains of undesirable orientations are secondary-recrystallized, thus resulting in deterioration of magnetic properties. In this temperature region, the N content should most preferably be within a range of from about 20 to 50 wtppm.

The N content in steel can be controlled by the following means:

(a) Increasing the nitrogen partial pressure in the atmosphere at least in a temperature region of from about 850 to 950° C. during the final finish annealing. In this case, the nitrogen partial pressure in the atmosphere is changed in response to the material composition.

(b) Adding a nitriding accelerating agent to the annealing separator. The nitriding agent is TiN, FeN or MnN having a function of nitriding a steel sheet through decomposition during final finish annealing. It suffices to add these nitriding agents in an amount of from about 0.1 to 10 wt % to the annealing separator.

Even after final finish annealing as described above, the Al content should preferably be reduced to about 100 ppm or less, and the contents of B, V, Nb, Se, S, [P,] and N should preferably be reduced to about 50 ppm or less, or more preferably, to about 30 ppm or less for the entire steel sheet including the oxide film. For this purpose, it is important to reduce the contents of these elements in the material stage. It is also important that the annealing separator not contain any of these elements.

The maximum temperature of the final finish annealing should preferably be up to about 1,200° C. With a maximum temperature of over about 1,120° C., extra-fine grains having a grain size of from at least about 0.03 mm up to about 0.30 mm are absorbed by coarse secondary recrystallization grains and reduced in number, resulting in an insufficient improvement of iron loss.

The annealing atmosphere should preferably be a non-oxidizing atmosphere for preventing excessive oxidation of the steel sheet.

When using MgO as an annealing separator in the invention, an ordinary grain-oriented magnetic steel sheet has an oxide film mainly comprising forsterite. It is effective to provide an insulating coating on the surface of the steel sheet. For this purpose, it is desirable to make a multilayer film comprising two or more films. A coating comprising a mixture containing a resin may be applied.

When not using MgO as an annealing separator, a grain-oriented magnetic steel sheet of a high magnetic flux density having no forsterite is manufactured. Then, after mirror-polishing the surface by electrolytic polishing, chemical polishing or thermal etching based on high-temperature annealing, it is possible to largely reduce iron loss by imparting a tension to the steel sheet by the application of a process of vapor-depositing a tensile film of TiN or $Si_3N_4$, a process of electro-plating chromium, or a process of coating alumina sol. In the case of a magnetic steel sheet using an inhibitor, the step of removing the forsterite film, or the technique of preventing formation of forsterite by the use of a special annealing separator is necessary for mirror-polishing the surface. In the invention, however, a product not having forsterite is easily available, thus permitting application of the aforementioned iron loss reducing technique at a low cost. For further improvement of iron loss, it is effective to provide a tensile film on the surface of the steel sheet. For this purpose, a multilayer film structure comprising two or more kinds of film may be adopted. Depending upon the use, a coating comprising a mixture containing a resin may be applied.

Further, in order to obtain satisfactory iron loss, a magnetic domain dividing technique may be used. Applicable magnetic domain dividing processes include a process of irradiating apulse laser onto a product sheet disclosed in Japanese Patent Publication No. 57-2252, a process of irradiating a plasma flame onto a product sheet disclosed in Japanese Unexamined Patent Publication No. 62-96617, and a process of providing a groove by etching before decarburization annealing disclosed in Japanese Patent Publication No. 3-69968.

It is desirable to cause fine grains to remain in coarse secondary recrystallization grains.

We will now describe an experiment carried out for investigation of a secondary recrystallized grain texture that is favorable for improving iron loss in a product manufactured by use of a grain-oriented magnetic steel sheet that has no inhibitor.

Figure 6:
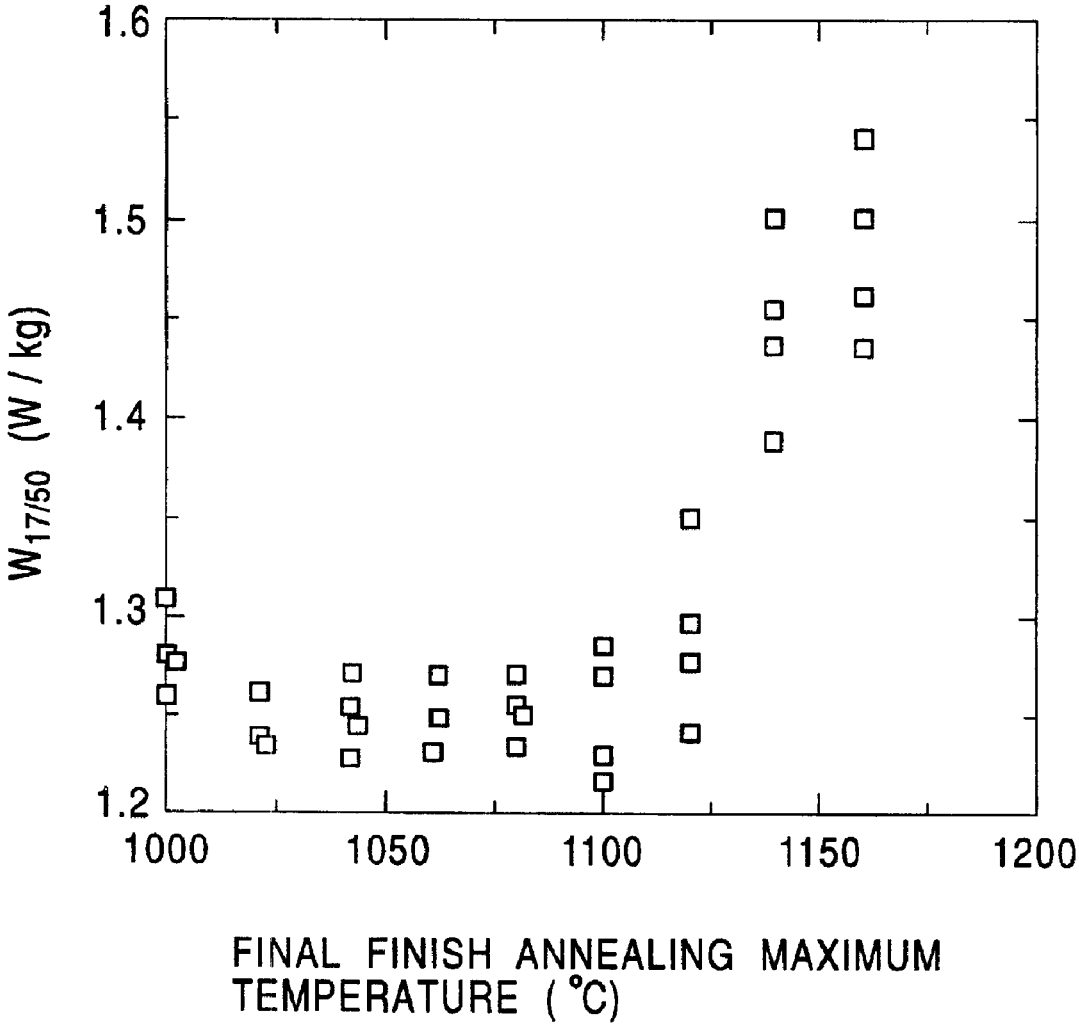
FIG. 6 is a graph illustrating the relationship between maximum temperature in a final finish annealing and iron loss of the product sheet.

A steel slab containing 0.070 wt % C, 3.22 wt % Si, and 0.070 wt % Mn, having an Al content reduced to 30 wtppm, an N content reduced to about 10 wtppm and an O content reduced to about 15 wtppm, and the contents of the other impurities limited to down to about 30 wtppm, respectively, was manufactured by the continuous casting process. After heating the slab to 1,100° C., the slab was hot-rolled to a thickness of 2.6 mm. Then, after hot-rolled sheet annealing at 1,000° C. for a minute in a nitrogen atmosphere, the sheet was rapidly cooled and cold-rolled into a final thickness of 0.35 mm. Subsequently, decarburization annealing was then applied at 840° C. for 120 seconds in an atmosphere comprising 75% hydrogen and 25% nitrogen with a dew point of 65° C. to reduce the C content in the steel to 0.0020 wt %. Then, after coating with an annealing separator mainly comprising MgO, final finish annealing was performed. The final finish annealing was carried out in a nitrogen atmosphere, and the heating rate and the maximum reachable temperature were varied. FIG. 6 illustrates the result of our investigation of the relationship between iron loss of the product sheet and the maximum temperature during final finish annealing.

As is clear from FIG. 6, a satisfactory iron loss was obtained in a case with a maximum reachable temperature of up to 1,100° C.

Further, we investigated the relationship between the frequency of occurrence of extra-fine grains present in secondary recrystallization grains and magnetic properties.

Figure 7:
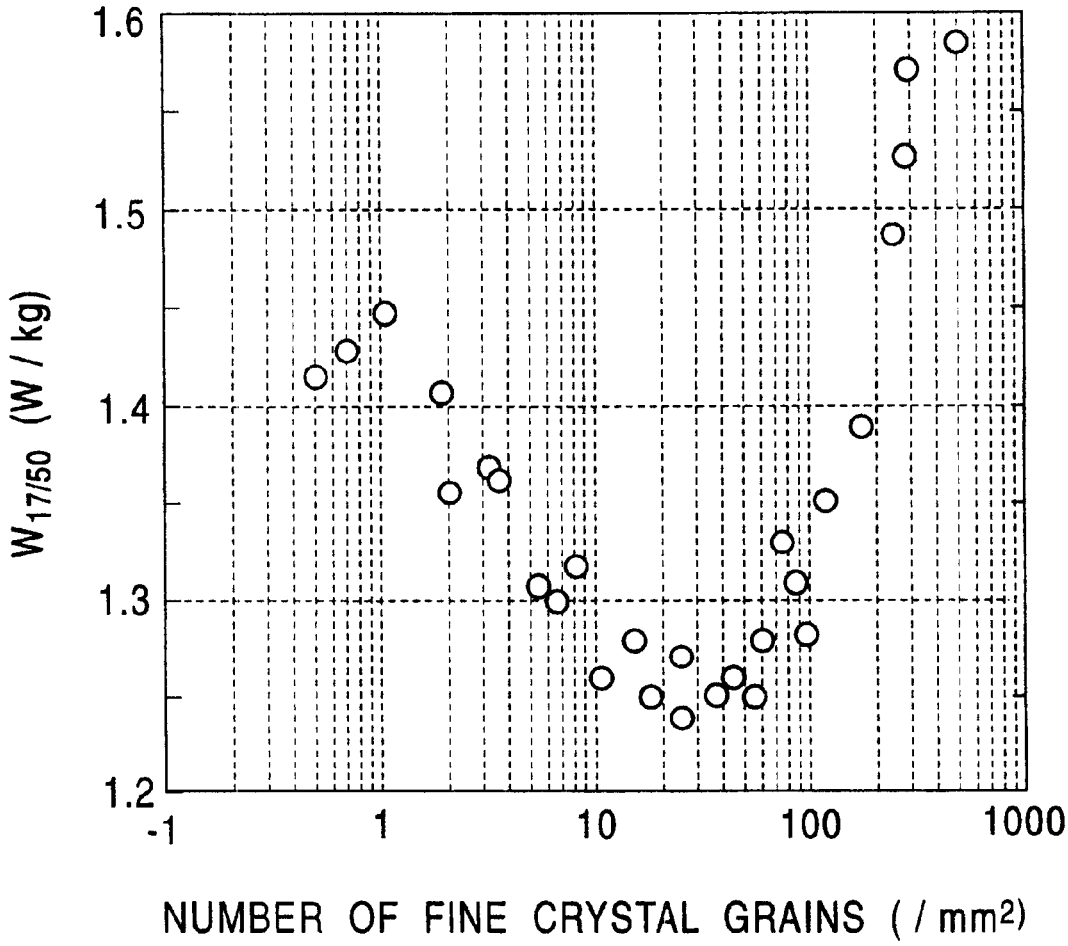
FIG. 7 is a graph illustrating the relationship between the frequency of occurrence of extra-fine crystal grains, having a grain size of at least 0.03 mm and up to 0.30 mm, existing in the secondary recrystallization and iron loss of the product sheet.

FIG. 7 illustrates the relationship between iron loss of the product sheet, on the one hand, and the frequency of occurrence of extra-fine grains having a grain size of from at least about 0.03 mm to up to about 0.30 mm among secondary recrystallization grains, on the other hand, in the above-mentioned experiment. According to the result, a satisfactory iron loss was found available within the range of the number of extra-fine grains, having a grain size of from at least about 0.03 mm to up to about 0.30 mm present among coarse secondary recrystallization grains, of from about $3/mm^2$ to about $200/mm^2$, particularly from about $5/mm^2$ to about $100/mm^2$.

It was also found that such an arrangement of extra-fine grains is achievable at a reachable temperature of up to about 1,120° C. in the final finish annealing. A conceivable reason is that, with a final finish annealing temperature of over about 1,120° C., extra-fine grains having a grain size of from about 0.03 mm up to about 0.30 mm are encroached upon by coarse secondary recrystallization grains.

Although the reason for the availability of a low iron loss by the presence of the extra-fine grains remaining in the coarse secondary recrystallization grains is not clear, we consider as follows. When fine grains remain in the coarse secondary recrystallized grains, a magnetic pole is generated on the grain boundary between the coarse secondary recrystallized grains and the fine grains. The magnetic domain is divided under this effect, and iron loss can be reduced. The extra-fine grains having a grain size of from about 0.03 to about 0.30 mm, which is important to the present invention, can generate a magnetic pole without interrupting the flow of the magnetic flux as compared with grains having a grain size of over about 0.30 mm. Iron loss can therefore be improved without causing a decrease in magnetic flux density.

The average grain size of the product sheet should preferably be at least about 3 mm when converted into a diameter of a corresponding circle as a result of calculation, performed by excluding grains having a diameter smaller than about 1 mm.

This is because a grain size of under about 3 mm leads to a lower magnetic flux density. No limitation is imposed on the upper limit of grain size which has no effect on iron loss.

The diameter (D) of a corresponding circle is given by the following formula, on the assumption that the number of grains per unit area (S) is n:

$$D=2(S/n\pi)^{1/2}$$

Upon setting forth the grain size, grains having a grain size smaller than 1 mm are excluded because the number of such fine grains is larger than that of usual secondary recrystallized grains having a grain size larger than 1 mm, and inclusion of these fine grains would result in a large fluctuation of the value of average grains size.

In a thickness-direction cross section, there should preferably be present extra-fine grains having a grain size of from at least 0.03 mm to up to 0.30 mm in a number within a range of from at least $3/mm^2$ to up to $200/mm^2$.

A grain size of fine grains of under 0.03 mm leads to a poor generating effect of magnetic poles, thus permitting no improvement of iron loss. A grain size of over 0.03 mm results in a lower magnetic flux density. The grain size of fine grains should therefore be within a range of from at least about 0.03 mm to up to about 0.30 mm. Further, as shown in FIG. 7, with a frequency of occurrence of such fine grains of under about $3/mm^2$, the amount of generation of magnetic pole is small, leading to an insufficient improvement of iron loss. A frequency of over about $200/mm^2$ results, on the other hand, in a decrease in magnetic flux density. The frequency of occurrence should therefore be within a range of from at least about $3/mm^2$ to up to about $200/mm^2$ or more preferably, from at least about $5/mm^2$ to up to about $100/mm^2$.

Further, in order to obtain a high magnetic flux density, in the final finish annealing, the steel sheet should preferably be heated by imparting a temperature gradient within a range of from at least about 1.0° C./cm to up to about 10° C./cm in a temperature region of from at least about 850° C. to the completion of secondary recrystallization.

An experiment carried out to investigate finish annealing conditions favorable for improving iron loss of a product based on the manufacturing method of a grain-oriented magnetic steel sheet not using an inhibitor will now be described.

Using a steel composition comprising 0.070 wt % C, 3.22 wt % Si, 0.070 wt % Mn and 0.0030 wt % Al as a basic composition, a slab containing 5 wtppm Se, 6 wtppm S, 5 wtppm N and 15 wtppm O in addition to the basic composition was manufactured by the continuous casting process. Then, after heating to 1,100° C., the slab was hot-rolled to a finished steel sheet thickness of 2.6 mm. The resultant hot-rolled steel sheet was soaked at 1,000° C. in a nitrogen atmosphere for a minute, and then rapidly cooled. The sheet was then cold-rolled into a final thickness of 0.34 mm. The resultant sheet was soaked at 840° C. in an atmosphere comprising 75% hydrogen and 25% nitrogen and having a dew point of 65° C. to carry out a decarburization annealing for 120 seconds, to reduce the C content to 0.0020 wt %. Thereafter, after coating MgO as an annealing separator, a final finish annealing was conducted in a hydrogen atmosphere to study the effect of the final finish annealing on magnetic flux density.

First, during the final finish annealing, an experiment of heating at a rate of 20° C./h was carried out without imparting a temperature gradient. Secondary recrystallization was started at 900° C. and completed at 1,030° C. A magnetic flux density of the product of $B_8$=1.883 T was obtained in this experiment.

Thereafter, the final finish annealing of imparting various temperature gradients up to 1,050° C. at a heating rate of 20° C./h was carried out. This annealing was accomplished by the following two processes. One comprised the steps of heating an end of a sample to 900° C., the secondary recrystallization starting temperature region, imparting a temperature gradient to the sample, and starting heating at a rate of 20° C./h while keeping the temperature gradient. The other process comprised the steps of imparting a temperature gradient to the sample by heating an end of the sample to 850° C., a temperature lower than that for the start of secondary recrystallization, and heating the same at a rate of 20° C./h while keeping the temperature gradient.

Figure 8:
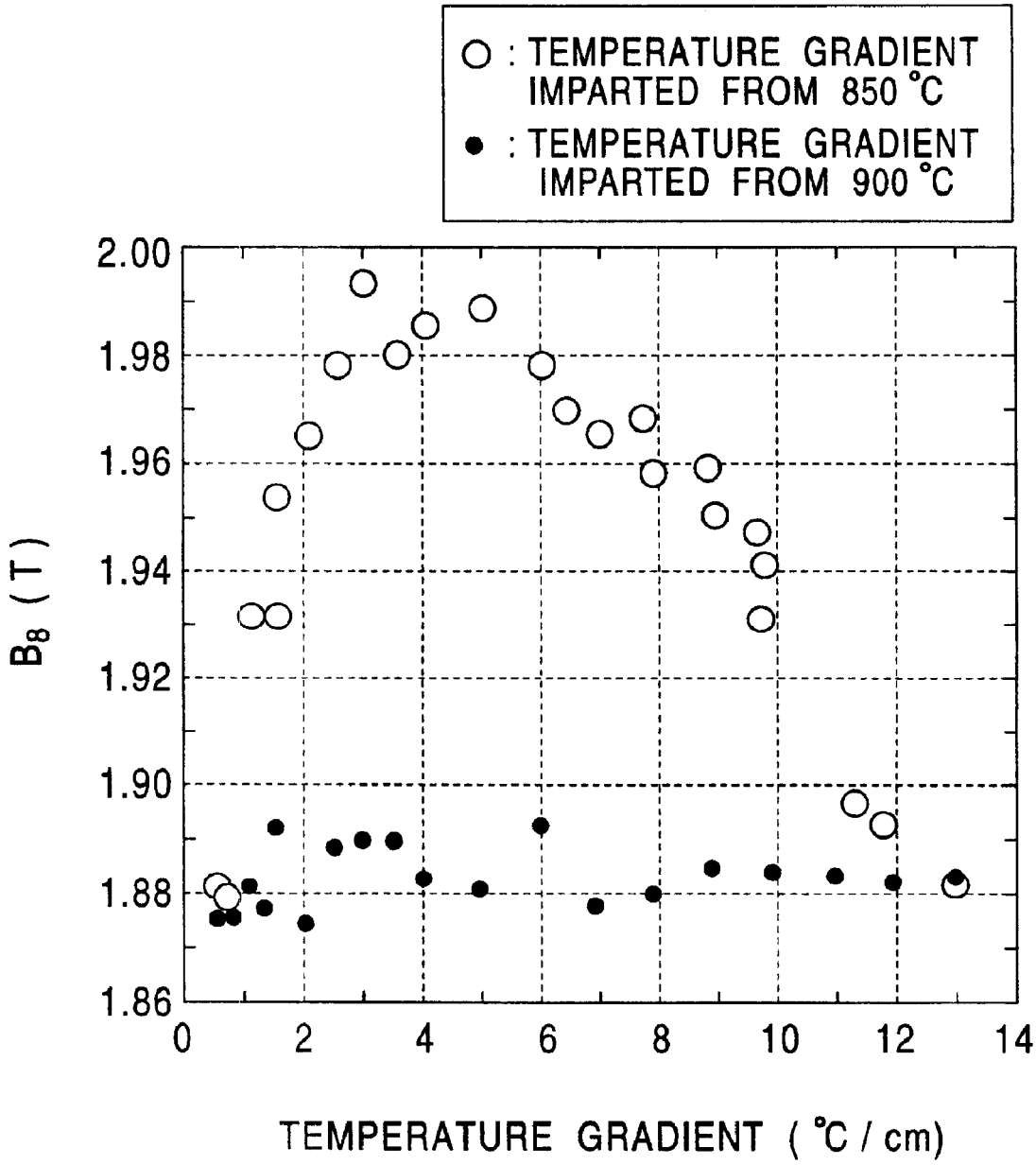
FIG. 8 is a graph illustrating the relationship between the temperature gradient in the final finish annealing and the magnetic flux density in the rolling direction of the product sheet.

FIG. 8 illustrates the effect of temperature gradient on magnetic flux density. FIG. 8 suggests that magnetic flux density largely varies with the temperature gradient and the temperature region giving the temperature gradient. More specifically, in the process of imparting a temperature gradient from 850° C., a temperature lower than the secondary recrystallization temperature, a high magnetic flux density is obtained within a range of temperature gradient of from 1.5 to 10° C./cm. In the process of giving a temperature gradient from 900° C., the secondary recrystallization starting temperature, there was available only a magnetic flux density of the same order as in the case of soaking and annealing carried out without giving a temperature gradient.

When the temperature at which imparting a temperature gradient is started is over about 850° C., or when imparting a temperature gradient is discontinued before the completion of secondary recrystallization, magnetic flux density decreases. The temperature gradient should therefore be imparted within a temperature region of from at least about 850° C. to the completion of secondary recrystallization. On the other hand, a temperature gradient from the room temperature may be imparted because the lower limit temperature for starting imparting a temperature gradient exerts no particular effect on magnetic flux density. However, within the temperature region of from at least about 850° C. to the completion of secondary recrystallization, it is necessary to continue imparting the temperature gradient. When the heating rate in the temperature region in which the temperature gradient is imparted is over about 50° C., secondary recrystallization grains of undesired orientations are produced and magnetic flux density decreases. The heating rate should therefore be up to about 50° C./h. The direction of the temperature gradient imparted to the steel sheet may be arbitrarily selected. The temperature gradient suffices to be within a range of from at least about 1.0° C./cm to up to about 10° C./cm. It is not necessary that it is constant. Recommended techniques for imparting a temperature gradient include a technique of moving a coil in an annealing furnace imparted with a furnace temperature gradient, and a technique of heating by controlling the furnace temperature for each zone while keeping the fixed coil.

Japanese Patent Publication No. 58-50925 discloses a technique of causing progress of secondary recrystallization while giving a temperature gradient on the boundary between the primary recrystallization region and the secondary recrystallization region. This technique comprises the steps of imparting a temperature gradient to the boundary region between the primary recrystallization region and the secondary recrystallization region, and causing growth of secondary recrystallization grains nucleated at a high temperature by the temperature gradient toward the low temperature side. In this technique, a temperature gradient is imparted even in the state of the primary recrystallization texture before start of secondary recrystallization, and heating is conducted while imparting the temperature gradient until the completion of secondary recrystallization. When applying this technique to a composition not using an inhibitor, magnetic flux density is not always improved, although it is easy to cause growth of the secondary recrystallization grains to coarser grains. In contrast, when applying the method of the invention of imparting a temperature gradient even in the state of primary recrystallized grain texture before start of secondary recrystallization and heating while maintaining the temperature gradient to a composition not using an inhibitor, magnetic flux density was improved. When no inhibitor is present, grain growth tends to proceed easily at temperatures lower than the secondary recrystallization starting temperature, and a considerable change in texture occurs in the stage of up to nucleation of secondary recrystallization grains. In the presence of a temperature gradient at this point, an appropriate change in texture is caused by grain growth, and this is considered to permit improvement of magnetic flux density. Slightly varying with the process conditions, the temperature at which secondary recrystallization is completed should preferably be within a range of from about 900 to about 1,050° C.

EXAMPLES

Example 1

Steel slabs having the compositions shown in Table 1 were manufactured by continuous casting. After heating to 1,050° C. for 20 minutes, each slab was hot-rolled into a thickness of 2.5 mm. The resultant hot-rolled sheet was subjected to a hot-rolled sheet annealing at 1,000° C. for 60 seconds, and cold-rolled into a final thickness of 0.34 mm. Then, a decarburization annealing was applied at 830° C. for 120 seconds in an atmosphere comprising 75% hydrogen and 25% nitrogen with a dew point of 60° C. to reduce the C content in steel to 0.0020 wt %. Then, after coating an annealing separator mainly comprising Mgo, a final finish annealing was carried out. For comparison purposes, borax was partially employed as an annealing separator. In the final finish annealing, the sheet was heated to 1,050° C. at a rate of 15° C./h in an atmosphere shown in Table 2.

In the course of the aforementioned manufacturing steps, the steel sheet with a film before the final finish annealing was analyzed to investigate the contents of Al, B, V, Nb, Se and S. Magnetic flux density $B_8$ and iron loss $W_{17/50}$ for the steel sheet after the final finish annealing were measured. Further, during the final finish annealing, the sample was taken out from the coil outer winding at temperatures of 850, 900, and 950° C. to analyze the nitrogen content in steel.

The steel sheet with the oxide film after the final finish annealing was analyzed to investigate the contents of Al, B, V, Nb, Se and S. The results are comprehensively shown in Table 2.

As is clear from Table 2, in each of steel samples Nos. 1 to 11 prepared in compliance with the invention, a steel slab not containing an inhibitor constituent and having an O content in steel inhibited to up to 30 wtppm was used, and the Al content in the steel sheet with the oxide film before the final finish annealing was reduced to up to 100 wtppm, and the contents of B, V, Nb, Se, S, and N were reduced to up to 50 wtppm, respectively. During the final finish annealing, the nitrogen content within a temperature range of from 850 to 950° C. was controlled within a range of from 6 to 80 ppm. In any of these cases, a product having satisfactory magnetic properties was obtained.

Example 2

A thin slab containing 7 wtppm C, 3.4 wt % Si, 0.15 wt % Mn, 29 wtppm N, 10 wtppm O, 19 wtppm Al, 3 wtppm B, 10 wtppm V, 20 wtppm Nb, 10 wtppm Se, and 10 wtppm S, and the balance substantially Fe, and having a thickness of 4.5 mm was manufactured by continuous casting. The slab was cold-rolled into a final thickness of 0.90 mm.

Analysis of the contents of Al, B, V, Nb, Se, S, and N in the cold-rolled steel sheet before the final finish annealing showed that each of these contents was reduced to up to 50 wtppm in all cases.

Then, after coating an annealing separator mainly comprising MgO, the final finish annealing was carried out. The final finish annealing was accomplished by heating to 950° C. at a rate of 15° C./h in an atmosphere shown in Table 3. Magnetic flux density $B_8$ and the maximum magnetic permeability $\mu_{max}$ of the thus obtained grain-oriented magnetic steel sheet were measured. During the final finish annealing, samples were taken out from the outer winding of the coil at temperatures of 850, 900, and 950° C. to analyze the nitrogen content in steel. The result is shown in Table 3.

As shown in Table 3, when a thin slab of a high-purity composition not containing an inhibitor constituent with a reduced C content was used as a material as in Nos. 1 to 4, a product of a high magnetic permeability was obtained by reducing the contents of Al, B, V, Nb, Se, S, and N in the steel sheet with an oxide film before the final finish annealing to up to 50 ppm, respectively, and controlling the nitrogen content within a range of from 6 to 80 ppm in a temperature range of from 850 to 950° C. during the final finish annealing, even when omitting the decarburization annealing.

Example 3

Steel slabs comprising the compositions shown in Table 4 were manufactured. Then, each slab was heated to 1,250° C. for 20 minutes, and hot-rolled into a hot-rolled sheet having a thickness of 2.8 mm. Then, after subjecting the sheet to a hot-rolled sheet annealing at 1,000° C. for 60 seconds, the annealed sheet was finished through cold rolling into a final thickness of 0.29 mm. Thereafter, a decarburization annealing was applied at 850° C. for 120 seconds in an atmosphere comprising 75% hydrogen and 25% nitrogen with a dew point of 40° C. to reduce the C content in steel to 0.0020 wt %, and after coating an annealing separator mainly comprising a constituent shown in Table 5, a final finish annealing was applied. The final finish annealing was carried out by heating the sheet to 1,100° C. at a rate of 20° C./h in a mixed atmosphere of 50% nitrogen and 50% hydrogen, and holding the sheet at this temperature in a hydrogen atmosphere for five hours.

Magnetic flux density $B_8$ and iron loss $w_{17/50}$ were measured for each product sheet thus obtained. The sheet with a film after the final finish annealing was composition-analyzed to investigate the contents of Al, B, Se and S. The result is also shown in Table 5.

As is clear from Table 5, a product of a satisfactory iron loss was obtained when the contents of Al, B, Se and S in the magnetic steel sheet after the final finish annealing were reduced to up to 20 wtppm, respectively, in accordance with the present invention.

Example 4

Steel slabs comprising the compositions shown in Table 6 were manufactured. Then, each slab was heated to 1,100° C.

for 20 minutes, and hot-rolled into a hot-rolled sheet having a thickness of 2.4 mm. Then, after subjected the sheet to a cold rolling into an intermediate thickness of 1.8 mm, and applying an intermediate annealing at 1,100° C. for 30 seconds, the sheet was finished through a warm rolling at 200° C. into a final thickness of 0.22 mm. Thereafter, a decarburization annealing was applied at 880° C. for 100 seconds in an atmosphere comprising 75% hydrogen and 25% nitrogen with a dew point of 60° C. to reduce the C content in steel to 0.0020 wt %, and after coating an annealing separator mainly comprising MgO, a final finish annealing was applied. The final finish annealing was carried out by heating the sheet to 1,100° C. at a rate of 20° C./h in a mixed atmosphere of 50% nitrogen and 50% hydrogen. After the final finish annealing, magnesium phosphate containing 50% colloidal silica was coated, and the coating was baked at 800° C. for two minutes also for flattening annealing. Then, after baking, a magnetic domain dividing treatment was applied by irradiating a pulse laser at intervals of 15 mm in the rolling direction and in the transverse direction.

Magnetic flux density $B_8$ and iron loss $W_{17/50}$ were measured for each product sheet thus obtained. The sheet with a film after the final finish annealing was composition-analyzed to investigate the contents of Al, B, Se and S. The result is also shown in Table 6.

As shown in Table 6, a product of a satisfactory iron loss was obtained when the contents of Al, B, Se and S in the magnetic steel sheet after the final finish annealing were reduced to up to 20 ppm, respectively.

Example 5

A steel slab containing 0.005 wt % C, 3.45 wt % Si, 0.15 wt % Mn, 0.30 wt % Ni, 50 wtppm Al, 15 wtppm N, and 10 wtppm O and the balance substantially Fe was manufactured by continuous casting. Then, after heating at 1,050° C. for 20 minutes, the slab was hot-rolled into a hot-rolled sheet having a thickness of 2.5 mm. Then, after a hot-rolled sheet annealing at 1,000° C. for 60 seconds, the sheet was finished through a cold rolling into a final thickness of 0.34 mm. Then, the resultant sheet was subjected to a decarburization annealing at 900° C. for 10 seconds in an atmosphere comprising 75% hydrogen and 25% nitrogen with a dew point of 40° C. to reduce the C content in steel to 0.0020 wt %. After coating an annealing separator mainly comprising MgO, a final finish annealing was applied. The final finish annealing was carried out under conditions shown in Table 7.

Magnetic flux density $B_8$ and iron loss $W_{17/50}$ were measured for each product sheet thus obtained. Also investigated was the average grain size of secondary recrystallized grains as calculated by excluding grains having a grain size smaller than 1 nm, and the frequency of presence of extra-fine grains having a grain size of from at least 0.03 mm to up to 0.30 mm existing on a thickness direction cross-section. The result is also shown in Table 7.

As is clear from Table 7, a satisfactory iron loss property was available with an average grain size of secondary recrystallized grains of at least 3 mm as converted into a diameter of a corresponding circle, and within a range of frequency of presence of from at least $5/mm^2$ to up to $100/mm^2$ of extra-fine grains having a grain size of from at least 0.03 mm to up to 0.30 mm on a thickness direction cross-section.

Example 6

A slab containing 40 wtppm C, 3.23 wt % Si, 0.20 wt % Mn, 0.0030 wt % Al, 5 wtppm Se, 6 wtppm S, 13 wtppm N, 12 wtppm O and the balance substantially Fe by continuous casting. The slab was heated at 1,050° C. for 20 seconds, and finished through a hot rolling into a thickness of 2.5 mm. Thereafter, a hot-rolled sheet annealing was applied at 1,000° C. for 60 seconds, and then, finished through a cold rolling into a final thickness of 0.34 mm. Then, soaking was applied at 830° C. and a decarburization annealing was applied for 20 seconds in an atmosphere comprising 75% hydrogen and 25% nitrogen with a dew point of 60° C. to reduce the C content to 10 wtppm. Subsequently, after coating MgO as an annealing separator, a final finish annealing was carried out. The final finish annealing was carried out by imparting a temperature gradient under conditions shown in Table 8 in up and down directions of the coil and heating to 1,050° C. Magnetic flux density $B_8$ and iron loss $W_{17/50}$ were measured for the sheet thus obtained. The results are shown in Table 8.

The results shown in Table 8 suggest that a product of a high magnetic flux density is available by using a slab having a composition in which the contents of Se, S, N and O are reduced to 30 wtppm or less, respectively, not using an inhibitor, and by imparting a temperature gradient of from 1.0 to 10° C./cm within a temperature range of from 850 to 1,050° C. during the final finish annealing.

Example 7

A slab comprising the composition shown in Table 9 was finished through a direct hot rolling without reheating, into a thickness of 4.0 mm. After carrying out a hot-rolled sheet annealing under conditions shown in Table 9, the sheet was finished through a cold rolling into a thickness of 1.8 mm, and the sheet was soaked at 950° C. and subjected to an intermediate annealing for 60 seconds. Thereafter, the sheet was finished through a cold rolling into a final thickness of 0.22 mm, and a decarburization annealing was applied comprising soaking at 830° C. for 120 seconds in an atmosphere comprising 75% hydrogen and 25% nitrogen with a dew point of 60° C. to reduce the C content to 0.0020 wt %. After coating an annealing parting agent mainly comprising MgO onto the surface of the sheet, a final finish annealing was carried out. In the final finish annealing, a temperature gradient of 2.5° C./cm was imparted in up and down directions of the coil within the temperature range of at least 800° C., and the annealing was completed by heating to 1,000° C. in a mixed atmosphere comprising 25% nitrogen and 75% hydrogen at a rate of 15° C./h. Magnetic flux density $B_8$ and iron loss $W_{17/50}$ were measured for the steel sheet thus obtained. The result is also shown in Table 9.

Table 9 reveals that, even when an intermediate annealing is conducted, a product of a high magnetic flux density is available by using a slab of a high-purity composition not using an inhibitor, in which the contents of Se, S, N and O are reduced to up to 30 ppm, respectively and carrying out a final finish annealing by imparting a temperature gradient within a temperature range of from 800 to 1,000° C.

According to the present invention, as described above, a product having satisfactory magnetic properties was created by using a steel slab having a high-purity composition not containing an inhibitor constituent, reducing the Al content to down to 100 wtppm, and the contents of B, V, Nb, Se, S, and N to down to 50 wtppm, respectively, in the steel sheet with an oxide film before final finish annealing, and controlling the nitrogen content within a range of from about 6 to 80 wtppm in a temperature range of from about 850 to 950° C. during final finish annealing. In order to obtain a further excellent iron loss property, it is desirable to achieve a crystal texture in which the average grain size as calculated by excluding grains smaller than 1 mm is down to about 3 mm as converted into a diameter of a corresponding circle, and the frequency of presence of extra-fine grains having a grain size of from at least about 0.03 mm to about 0.30 mm on the thickness direction cross section is at least about 3/mm$^2$ to about 200/mm$^2$, or impart a temperature gradient to the sheet in the finish annealing.

According to the present invention, high-temperature heating of slab or high-temperature purification annealing for removing impurities is not necessary, providing a remarkable economic benefit. Further, in the present invention, for a use not requiring a forsterite film, it is possible to use a material not containing C and omit the decarburization annealing step.

TABLE 1

| | Slab chemical composition (wt %) | | | | | | | | | | | | | | | | |
|---|---|---|---|---|---|---|---|---|---|---|---|---|---|---|---|---|---|
| No. | C | Si | Mn | N ppm | O ppm | Al ppm | B ppm | V ppm | Nb ppm | Se ppm | S ppm | Ni | Sn | Sb | Cu | Mo | Cr |
| 1 | 0.076 | 3.2 | 0.17 | 5 | 24 | 10 | 3 | 20 | 20 | 20 | 15 | 0.01 | 0.01 | tr | 0.01 | tr | tr |
| 2 | 0.071 | 3.3 | 0.13 | 11 | 8 | 8 | 2 | 20 | 10 | 20 | 4 | 0.01 | 0.01 | tr | 0.01 | tr | tr |
| 3 | 0.042 | 3.2 | 0.01 | 40 | 35 | 32 | 4 | 30 | 20 | 10 | 11 | 0.01 | 0.01 | tr | 0.01 | tr | tr |
| 4 | 0.003 | 3.3 | 0.15 | 21 | 21 | 75 | 16 | 20 | 10 | 20 | 15 | 0.01 | 0.01 | tr | 0.01 | tr | tr |
| 5 | 0.040 | 3.9 | 1.41 | 32 | 20 | 45 | 4 | 10 | 20 | 10 | 9 | 0.01 | 0.01 | tr | 0.01 | tr | tr |
| 6 | 0.095 | 3.5 | 0.17 | 35 | 11 | 31 | 9 | 40 | 20 | 10 | 11 | 0.01 | 0.01 | tr | 0.01 | tr | tr |
| 7 | 0.065 | 3.6 | 0.15 | 9 | 14 | 21 | 2 | 10 | 10 | 10 | 5 | 0.05 | 0.01 | tr | 0.01 | tr | tr |
| 8 | 0.055 | 3.1 | 0.14 | 21 | 19 | 11 | 2 | 10 | 10 | 10 | 8 | 0.01 | 0.05 | tr | 0.01 | tr | tr |
| 9 | 0.069 | 3.6 | 0.16 | 21 | 14 | 11 | 2 | 10 | 10 | 10 | 9 | 0.01 | 0.01 | 0.05 | 0.01 | tr | tr |
| 10 | 0.075 | 3.5 | 0.12 | 31 | 14 | 11 | 2 | 10 | 10 | 10 | 5 | 0.01 | 0.01 | 0.01 | 0.05 | tr | tr |
| 11 | 0.045 | 3.3 | 0.18 | 30 | 10 | 9 | 3 | 10 | 10 | 10 | 5 | 0.01 | 0.01 | tr | 0.01 | 0.05 | tr |
| 12 | 0.052 | 3.3 | 0.18 | 15 | 34 | 9 | 5 | 20 | 20 | 20 | 6 | 0.01 | 0.01 | tr | 0.01 | tr | tr |
| 13 | 0.031 | 3.4 | 0.16 | 80 | 22 | 22 | 8 | 20 | 30 | 10 | 7 | 0.01 | 0.01 | tr | 0.01 | tr | tr |
| 14 | 0.074 | 3.3 | 0.15 | 39 | 24 | 130 | 5 | 30 | 40 | 10 | 16 | 0.01 | 0.01 | tr | 0.01 | tr | tr |
| 15 | 0.068 | 3.3 | 0.15 | 33 | 23 | 170 | 2 | 20 | 10 | 10 | 6 | 0.01 | 0.01 | tr | 0.01 | tr | tr |
| 16 | 0.083 | 3.4 | 0.24 | 33 | 16 | 10 | 60 | 30 | 10 | 10 | 8 | 0.01 | 0.01 | tr | 0.01 | tr | tr |
| 17 | 0.043 | 3.3 | 0.17 | 24 | 38 | 18 | 7 | 100 | 10 | 10 | 6 | 0.01 | 0.01 | tr | 0.01 | tr | tr |
| 18 | 0.033 | 3.2 | 0.16 | 39 | 22 | 8 | 11 | 30 | 70 | 10 | 14 | 0.01 | 0.01 | tr | 0.01 | tr | tr |
| 19 | 0.065 | 3.1 | 0.07 | 43 | 16 | 22 | 3 | 20 | 20 | 140 | 15 | 0.01 | 0.01 | tr | 0.01 | tr | tr |
| 20 | 0.054 | 3.3 | 0.07 | 9 | 13 | 14 | 5 | 20 | 30 | 20 | 11 | 0.01 | 0.01 | tr | 0.01 | tr | tr |
| 21 | 0.055 | 3.4 | 0.19 | 17 | 25 | 43 | 7 | 30 | 20 | 10 | 4 | 0.01 | 0.01 | tr | 0.01 | tr | tr |
| 22 | 0.040 | 3.3 | 0.17 | 21 | 64 | 15 | 7 | 30 | 30 | 10 | 6 | 0.01 | 0.01 | tr | 0.01 | tr | tr |
| 23 | 0.028 | 3.1 | 0.25 | 24 | 11 | 95 | 3 | 10 | 20 | 10 | 13 | 0.01 | 0.01 | tr | 0.01 | tr | 0.30 |

TABLE 2

| | Al, B, V, Nb, Se, S and contents (over 50 ppm only) before and after final finish annealing | | Annealing | Nitrogen concentration in atmosphere during final finish | Nitrogen content in steel during final finish annealing (wtppm) | | | Magnetic flux density | Iron loss $W_{17/50}$ | |
|---|---|---|---|---|---|---|---|---|---|---|
| No. | before (wtppm) | after (wtppm) | separator | annealing (%) | 850° C. | 900° C. | 950° C. | $B_8$ (T) | (W/kg) | Remarks |
| 1 | All < 50 | All < 50 | Magnesia | 100 | 25 | 48 | 49 | 1.88 | 1.21 | Example of Invention |
| 2 | All < 50 | All < 50 | Magnesia | 40 | 16 | 25 | 13 | 1.86 | 1.23 | Example of Invention |
| 4 | All < 50 | All < 50 | Magnesia | 100 | 35 | 45 | 43 | 1.84 | 1.30 | Example of Invention |
| 5 | All < 50 | All < 50 | Magnesia | 100 | 46 | 62 | 70 | 1.79 | 1.27 | Example of Invention |
| 6 | All < 50 | All < 50 | Magnesia | 0 | 65 | 53 | 32 | 1.87 | 1.20 | Example of Invention |
| 7 | All < 50 | All < 50 | Magnesia | 25 | 23 | 28 | 31 | 1.90 | 1.18 | Example of Invention |
| 8 | All < 50 | All < 50 | Magnesia | 25 | 33 | 48 | 43 | 1.84 | 1.15 | Example of Invention |
| 9 | All < 50 | All < 50 | Magnesia | 25 | 23 | 38 | 45 | 1.87 | 1.15 | Example of Invention |
| 10 | All < 50 | All < 50 | Magnesia | 25 | 43 | 39 | 42 | 1.85 | 1.16 | Example of Invention |
| 11 | All < 50 | All < 50 | Magnesia | 25 | 33 | 38 | 41 | 1.85 | 1.15 | Example of Invention |
| 12 | All < 50 | All < 50 | Magnesia | 0 | 13 | 3 | 3 | 1.51 | 3.89 | Comparative Example |
| 13 | All < 50 | All < 50 | Magnesia | 100 | 91 | 105 | 110 | 1.71 | 1.59 | Comparative Example |
| 14 | Al: 120 | Al: 100 | Magnesia | 100 | 53 | 74 | 85 | 1.49 | 4.03 | Comparative Example |
| 15 | Al: 140 | Al: 120 | Magnesia | 100 | 93 | 109 | 139 | 1.43 | 4.23 | Comparative Example |
| 16 | B: 60 | B: 60 | Magnesia | 100 | 64 | 78 | 103 | 1.45 | 4.09 | Comparative Example |
| 17 | V: 100 | V: 90 | Magnesia | 100 | 75 | 88 | 109 | 1.51 | 3.89 | Comparative Example |
| 18 | Nb: 70 | Nb: 70 | Magnesia | 100 | 45 | 56 | 76 | 1.56 | 3.56 | Comparative Example |
| 19 | Se: 140 | Se: 130 | Magnesia | 100 | 13 | 45 | 55 | 1.65 | 3.02 | Comparative Example |
| 20 | S: 120 | S: 120 | Magnesia | 100 | 9 | 54 | 65 | 1.63 | 3.13 | Comparative Example |
| 21 | All < 50 | B: 80 | Borax | 100 | 39 | 44 | 56 | 1.75 | 1.93 | Comparative Example |
| 22 | All < 50 | All < 50 | Magnesia | 100 | 44 | 50 | 45 | 1.69 | 2.35 | Comparative Example |
| 23 | All < 50 | All < 50 | Magnesia | 100 | 29 | 41 | 38 | 1.84 | 1.18 | Example of Invention |

TABLE 3

| No. | Nitrogen concentration in atmosphere during final finish annealing (%) | Nitrogen content in steel during final finish annealing (wtppm) 850° C. | 900° C. | 950° C. | Magnetic flux density $B_8$ (T) | Maximum magnetic permeability $\mu_{max}$ | Remarks |
|---|---|---|---|---|---|---|---|
| 1 | 100 | 43 | 48 | 49 | 1.83 | 56000 | Example of Invention |
| 2 | 75 | 37 | 38 | 33 | 1.84 | 58000 | Example of Invention |
| 3 | 50 | 33 | 29 | 22 | 1.84 | 56000 | Example of Invention |
| 4 | 25 | 29 | 23 | 9 | 1.83 | 53000 | Example of Invention |
| 5 | 5 | 19 | 6 | 3 | 1.60 | 13000 | Comparative Example |

TABLE 4

| | Steel Slab Chemical Composition | | | | | | | | | |
|---|---|---|---|---|---|---|---|---|---|---|
| No. | C (wtppm) | Si (wt %) | Mn (wt %) | Ni (wt %) | O (wtppm) | N (wtppm) | Al (wtppm) | B (wtppm) | Se (wtppm) | S (wtppm) |
| 1 | 300 | 3.23 | 0.12 | 0.01 | 17 | 11 | 23 | tr | tr | 13 |
| 2 | 30 | 3.47 | 0.15 | 0.01 | 15 | 9 | 50 | tr | tr | 8 |
| 3 | 730 | 3.77 | 0.25 | 0.01 | 10 | 11 | 15 | tr | tr | 7 |
| 4 | 330 | 3.01 | 0.92 | 0.01 | 19 | 10 | 13 | tr | tr | 10 |
| 5 | 190 | 3.31 | 0.13 | 0.01 | 13 | 25 | 33 | tr | tr | 10 |
| 6 | 310 | 3.33 | 0.10 | 0.01 | 19 | 80 | 230 | tr | tr | 230 |
| 7 | 370 | 3.25 | 0.07 | 0.01 | 19 | 30 | 12 | tr | 180 | 21 |
| 8 | 410 | 3.41 | 0.12 | 0.01 | 19 | 70 | 10 | 73 | tr | 11 |
| 9 | 510 | 3.34 | 0.10 | 0.01 | 19 | 66 | 190 | tr | tr | 13 |
| 10 | 10 | 3.44 | 0.14 | 0.01 | 29 | 10 | 21 | tr | tr | 10 |
| 11 | 30 | 3.21 | 0.12 | 0.01 | 19 | 21 | 30 | tr | tr | 5 |

TABLE 5

| No. | Main constituents of annealing parting agent | Analysis after final finish annealing (wtppm) Al | B | Se | S | Iron loss $W_{17/50}$ (W/kg) | Magnetic flux density $B_8$ (T) | Remarks |
|---|---|---|---|---|---|---|---|---|
| 1 | MgO | 8 | tr | tr | 11 | 1.11 | 1.89 | Example of Invention |
| 2 | MgO | 15 | tr | tr | 6 | 1.13 | 1.87 | Example of Invention |
| 3 | MgO | 6 | tr | tr | 5 | 1.13 | 1.87 | Example of Invention |
| 4 | MgO | 8 | tr | tr | 9 | 1.15 | 1.87 | Example of Invention |
| 5 | MgO | 4 | tr | tr | 10 | 1.08 | 1.90 | Example of Invention |
| 6 | MgO | 110 | tr | tr | 86 | 1.28 | 1.89 | Comparative Example |
| 7 | MgO | 10 | tr | 70 | 9 | 1.35 | 1.87 | Comparative Example |
| 8 | MgO | 5 | 55 | tr | 8 | 1.27 | 1.86 | Comparative Example |
| 9 | MgO | 10 | tr | tr | 7 | 1.38 | 1.86 | Comparative Example |
| 10 | $Al_2O_3$ | 70 | tr | tr | 10 | 1.48 | 1.87 | Comparative Example |
| 11 | $MgO.Al_2O_4$ | 80 | tr | tr | 5 | 1.41 | 1.87 | Comparative Example |

TABLE 6

| | Steel slab chemical composition | | | | | | | | | |
|---|---|---|---|---|---|---|---|---|---|---|
| No. | C (wtppm) | Si (wt %) | Mn (wt %) | Ni (wt %) | O (wtppm) | N (wtppm) | Al (wtppm) | B (wtppm) | Se (wtppm) | S (wtppm) |
| 1 | 580 | 3.33 | 0.12 | 0.40 | 13 | 9 | 23 | tr | tr | 19 |
| 2 | 30 | 3.57 | 0.15 | 0.33 | 15 | 9 | 63 | tr | tr | 9 |
| 3 | 730 | 3.47 | 0.25 | 0.21 | 9 | 11 | 15 | tr | tr | 13 |
| 4 | 330 | 3.31 | 0.92 | 0.01 | 19 | 10 | 13 | tr | tr | 16 |
| 5 | 390 | 3.31 | 0.13 | 0.01 | 13 | 85 | 220 | tr | tr | 11 |

| No. | Analysis after final finish annealing (wtppm) Al | B | Se | S | Iron loss $W_{17/50}$ (W/kg) | Magnetic flux density $B_8$ (T) | Remarks |
|---|---|---|---|---|---|---|---|
| 1 | 7 | tr | tr | 10 | 0.70 | 1.93 | Example of Invention |
| 2 | 5 | tr | tr | 5 | 0.71 | 1.92 | Example of Invention |
| 3 | 3 | tr | tr | 5 | 0.71 | 1.92 | Example of Invention |

TABLE 6-continued

| | | | | | | | | |
|---|---|---|---|---|---|---|---|---|
| | 4 | 4 | tr | tr | 6 | 0.73 | 1.91 | Example of Invention |
| | 5 | 105 | tr | tr | 5 | 0.79 | 1.91 | Comparative Example |

TABLE 7

| | Final finish annealing conditions | | | Product plate secondary recrystallization grains | | Product plate magnetic properties | | |
|---|---|---|---|---|---|---|---|---|
| No. | Heating rate (° C./h) | Annealing atmosphere | Maximum reachable temperature (° C.) | Average grain size (mm) | Number of fine grains (number/mm$^2$) | Magnetic flux density (T) | Iron loss (W/kg) | Remarks |
| 1 | 10 | $N_2$ = 100% | 1025 | 26 | 12.3 | 1.90 | 1.15 | Example of Invention |
| 2 | 20 | $N_2$ = 100% | 1030 | 33 | 32.4 | 1.89 | 1.19 | Example of Invention |
| 3 | 5 | $N_2$ = 100% | 1000 | 9 | 62.5 | 1.88 | 1.19 | Example of Invention |
| 4 | 10 | $N_2$ = 50%<br>$H_2$ = 50% | 1100 | 11 | 22.3 | 1.90 | 1.16 | Example of Invention |
| 5 | 10 | $N_2$ = 50%<br>Ar = 50% | 1020 | 33 | 5.3 | 1.90 | 1.18 | Example of Invention |
| 6 | 10 | $H_2$ = 100% | 1020 | 19 | 72.3 | 1.88 | 1.19 | Example of Invention |
| 7 | 10 | Ar = 100% | 1040 | 20 | 12.9 | 1.89 | 1.18 | Example of Invention |
| 8 | 10 | $N_2$ = 100% | 1050 | 23 | 29.5 | 1.90 | 1.14 | Example of Invention |
| 9 | 10 | $N_2$ = 100% | 1020 | 25 | 82.3 | 1.88 | 1.19 | Example of Invention |
| 10 | 3 | $H_2$ = 100% | 1130 | 2 | 232.0 | 1.82 | 1.65 | Comparative Example |
| 11 | 50 | $N_2$ = 100% | 1150 | 53 | 1.5 | 1.85 | 1.55 | Comparative Example |

TABLE 8

| | Temperature gradient imparting start temperature (° C.) | Temperature gradient (° C./cm) | Heating rate (° C./h) | Magnetic flux density $B_8$ (T) | Iron loss $W_{17/50}$ (W/kg) | Remarks |
|---|---|---|---|---|---|---|
| 1 | 850 | 1.0 | 15 | 1.955 | 1.16 | Example of Invention |
| 2 | 850 | 2.0 | 25 | 1.974 | 1.10 | Example of Invention |
| 3 | 850 | 5.0 | 15 | 1.965 | 1.15 | Example of Invention |
| 4 | 850 | 8.0 | 25 | 1.954 | 1.19 | Example of Invention |
| 5 | 850 | 2.0 | 20 | 1.970 | 1.13 | Example of Invention |
| 6 | 850 | 2.0 | 5 | 1.985 | 1.06 | Example of Invention |
| 7 | 850 | 2.0 | 3.5 | 1.975 | 1.13 | Example of Invention |
| 9 | 850 | 0.5 | 15 | 1.880 | 1.38 | Comparative Example |
| 10 | 900 | 12.0 | 5 | 1.875 | 1.39 | Comparative Example |

TABLE 9

| Steel | Molten steel chemical composition (wt %) (wtppm for O, N, Al and Se) | | | | | | | | | | | | | | Magnetic flux density | Iron loss $W_{17/50}$ | |
|---|---|---|---|---|---|---|---|---|---|---|---|---|---|---|---|---|---|
| symbol | C | Si | Mn | Ni | Sn | Sb | Cu | Mo | Cr | O | N | Al | Se | S | $B_8$ (T) | (W/kg) | Remarks |
| 1 | 520 | 3.35 | 0.13 | 0.30 | tr | tr | tr | tr | tr | 12 | 10 | 35 | tr | 18 | 1.99 | 0.79 | Example of Invention |
| 2 | 340 | 3.52 | 0.13 | 0.13 | tr | tr | tr | tr | tr | 13 | 15 | 43 | tr | 8 | 1.98 | 0.80 | Example of Invention |
| 3 | 630 | 3.57 | 0.25 | tr | tr | tr | tr | tr | tr | 13 | 13 | 21 | tr | 15 | 1.97 | 0.82 | Example of Invention |
| 4 | 30 | 3.42 | 0.25 | tr | 0.30 | tr | tr | tr | tr | 12 | 12 | 39 | tr | 17 | 1.56 | 0.77 | Example of Invention |
| 5 | 30 | 2.17 | 0.20 | tr | tr | 0.03 | tr | tr | tr | 11 | 11 | 13 | tr | 10 | 1.96 | 0.78 | Example of Invention |
| 6 | 520 | 3.22 | 0.02 | tr | tr | tr | 0.03 | tr | tr | 19 | 8 | 79 | tr | 13 | 1.97 | 0.80 | Example of Invention |
| 7 | 430 | 3.59 | 0.35 | tr | tr | tr | tr | 0.03 | tr | 10 | 10 | 15 | tr | 11 | 1.96 | 0.80 | Example of Invention |

TABLE 9-continued

| Steel | Molten steel chemical composition (wt %) (wtppm for O, N, Al and Se) | | | | | | | | | | | | | | Magnetic flux density | Iron loss $W_{17/50}$ | |
|---|---|---|---|---|---|---|---|---|---|---|---|---|---|---|---|---|---|
| symbol | C | Si | Mn | Ni | Sn | Sb | Cu | Mo | Cr | O | N | Al | Se | S | $B_8$ (T) | (W/kg) | Remarks |
| 8 | 330 | 3.35 | 0.05 | tr | tr | tr | tr | tr | 0.32 | 9 | 11 | 15 | tr | 13 | 1.96 | 3.80 | Example of Invention |
| 9 | 430 | 3.33 | 0.90 | tr | tr | tr | tr | tr | tr | 19 | 20 | 153 | tr | 16 | 1.70 | 1.59 | Comparative Example |
| 10 | 520 | 3.23 | 0.13 | tr | tr | tr | tr | tr | tr | 13 | 15 | 20 | 85 | 11 | 1.61 | 1.80 | Comparative Example |
| 11 | 420 | 3.36 | 0.13 | tr | tr | tr | tr | tr | tr | 10 | 19 | 24 | tr | 81 | 1.61 | 1.85 | Comparative Example |
| 12 | 530 | 3.30 | 0.30 | tr | tr | tr | tr | tr | tr | 15 | 64 | 21 | tr | 15 | 1.73 | 1.78 | Comparative Example |
| 13 | 350 | 3.20 | 0.08 | tr | tr | tr | tr | tr | tr | 54 | 14 | 23 | tr | 18 | 1.70 | 1.83 | Comparative Example |

What is claimed is:

1. A method of manufacturing a grain-oriented magnetic steel sheet, comprising the steps of hot-rolling a steel slab containing up to about 0.12 wt % C, from about 1.0 to 8.0 wt % Si, and from about 0.005 to 3.0 wt % Mn, optionally applying annealing to the resulting hot-rolled steel sheet, subjecting said annealed sheet or said hot-rolled sheet to one or more runs of cold rolling including intermediate annealing *in between*, optionally applying to the [intermediate annealed] *cold-rolled* sheet decarburization annealing, optionally coating the [intermediate annealed] *cold-rolled* sheet or the decarburized annealed sheet with an annealing separator and then applying final finish annealing; wherein:

(1) the O content of said steel slab is limited to up to about 30 wtppm;

(2) for the entire steel sheet having final thickness including oxide film before final finish annealing, the Al content is limited to up to about 100 wtppm, and the respective contents of B, V, Nb, Se, S, [P,] and N, are limited to up to about 50 wtppm each; and (3) during final finish annealing, the N content in the steel is limited within a range of from about 6 to 80 ppm, at least in a temperature region of from from 850 to 950° C.

2. The method according to claim 1, further comprising the step of controlling the N content in the steel during final finish annealing, said controlling step comprising one or more of:

(a) increasing the nitrogen partial pressure in the atmosphere at least in the temperature region of from about 850 to 950° C. during final finish annealing; and (b) adding a nitrification accelerating agent to said annealing separator.

3. The method according to claim 1, wherein the maximum temperature in the final finish annealing step is up to about 1,120° C.

4. The method according to claim 1, wherein at least in a temperature region from 850° C. to the completion of secondary recrystallization of the final finish annealing, heating is conducted at a heating rate of up to about 50° C./h while imparting a temperature gradient of at least about 1.0° C./cm and up to about 10° C./cm to the steel sheet.

5. The method according to claim 1, wherein said steel slab is a direct cast steel slab and wherein said direct cast steel slab is subjected directly to hot rolling without heating the steel slab.

6. The method according to claim 1, wherein direct cast hot rolling is carried out by the use of a thin slab having a thickness of up to about 100 mm obtained from molten steel by the direct casting process, or wherein the thin slab is used as a hot-rolled steel sheet material.

7. The method according to claim 1, wherein:

said steel slab has a composition further comprising one or more elements selected from the group consisting of:

Ni: from about 0.005 to 1.50 wt %,

Sn: from about 0.02 to 0.50 wt %,

Sb: from about 0.01 to 0.50 wt %,

Cu: from about 0.01 to 0.50 wt %,

Mo: from about 0.01 to 0.50 wt %, and

Cr: from about 0.01 to 0.50 wt %.

* * * * *

UNITED STATES PATENT AND TRADEMARK OFFICE

CERTIFICATE OF CORRECTION

PATENT NO. : RE 39,482 E
APPLICATION NO. : 10/263573
DATED : February 6, 2007
INVENTOR(S) : Hayakawa et al.

It is certified that error appears in the above-identified patent and that said Letters Patent is hereby corrected as shown below:

On the Title Page: (30)
In the Foreign Applications Priority data, please change "10-307056" to --10-307055--.

In Column 22:

At Table 2, at No. 13, at the subheading 900°C., please change "105" to --106--.

In Column 26:

At Table 7, at No. 10, at the subheading Number of fine grains, please change "232.0" to --222.0--.

At Table 9, at No. 4, at the subheading $B_8$, please change "1.56" to --1.96--.

Signed and Sealed this

Seventh Day of August, 2007

JON W. DUDAS
*Director of the United States Patent and Trademark Office*